Figure 8:
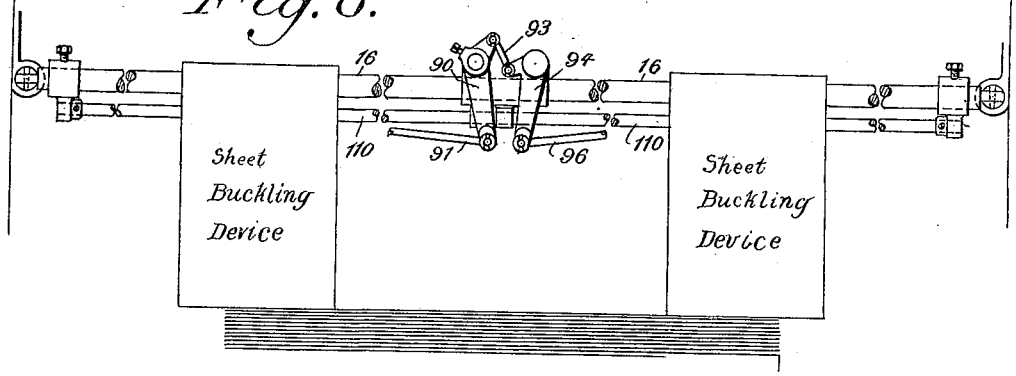

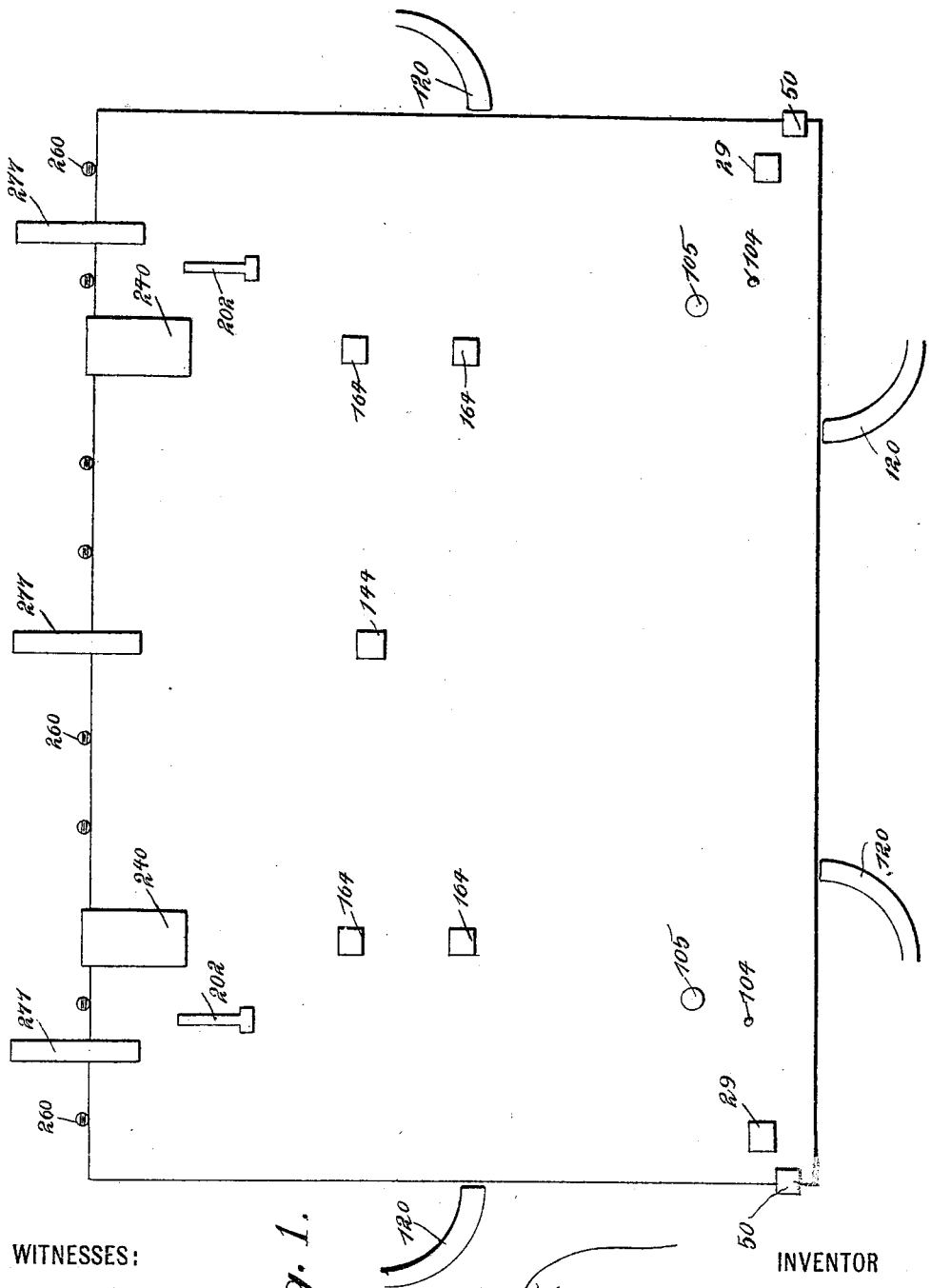

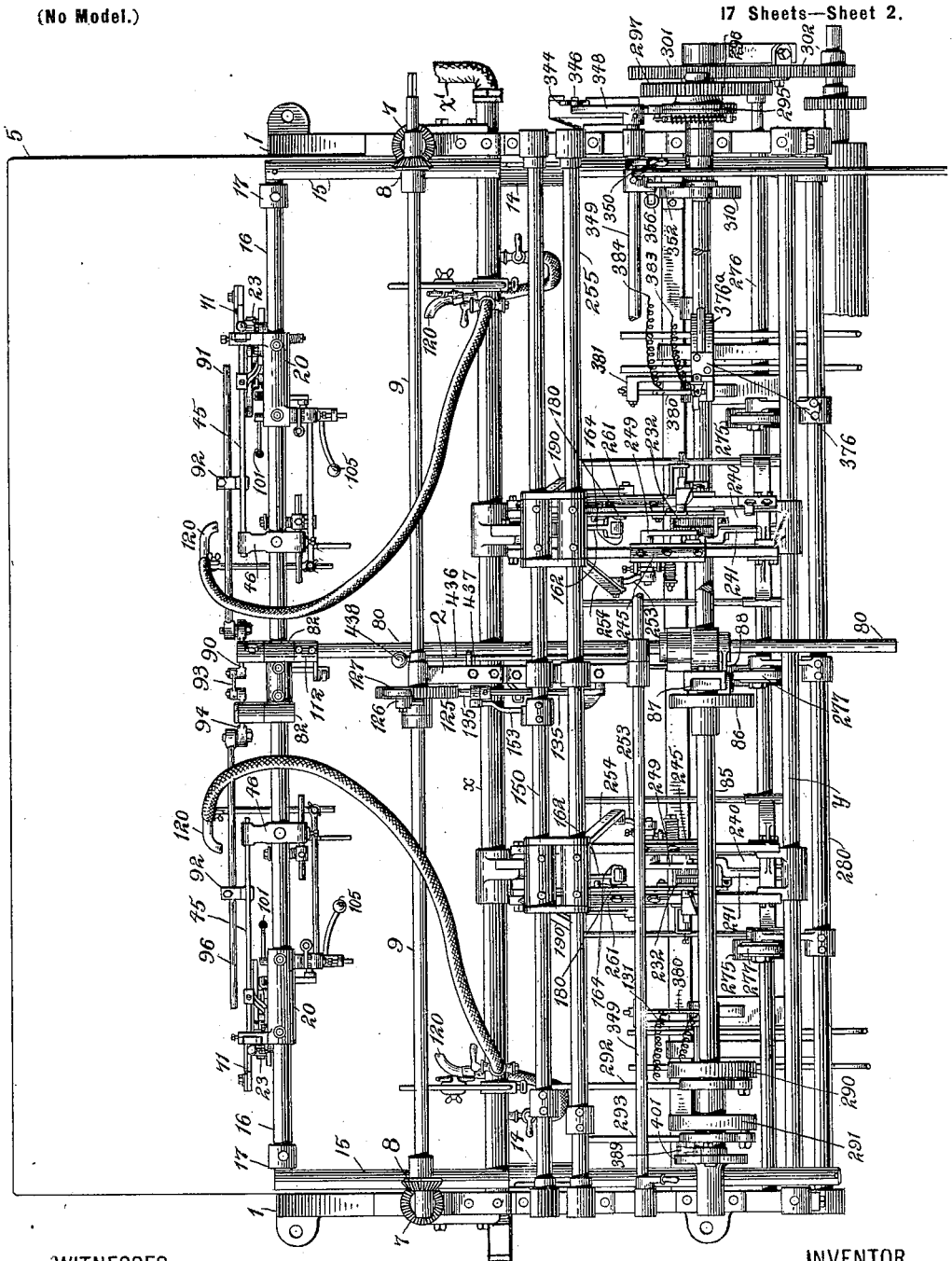

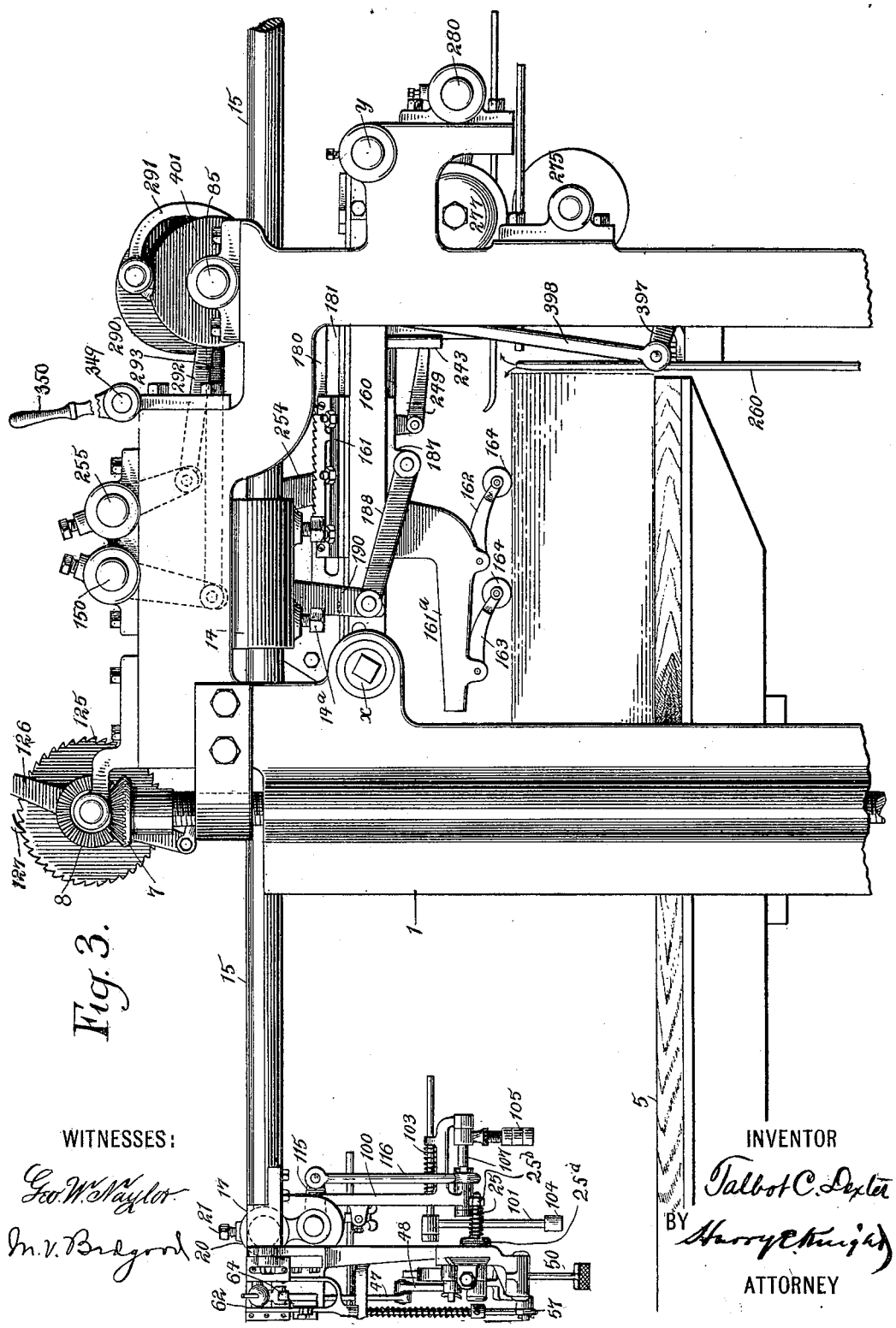

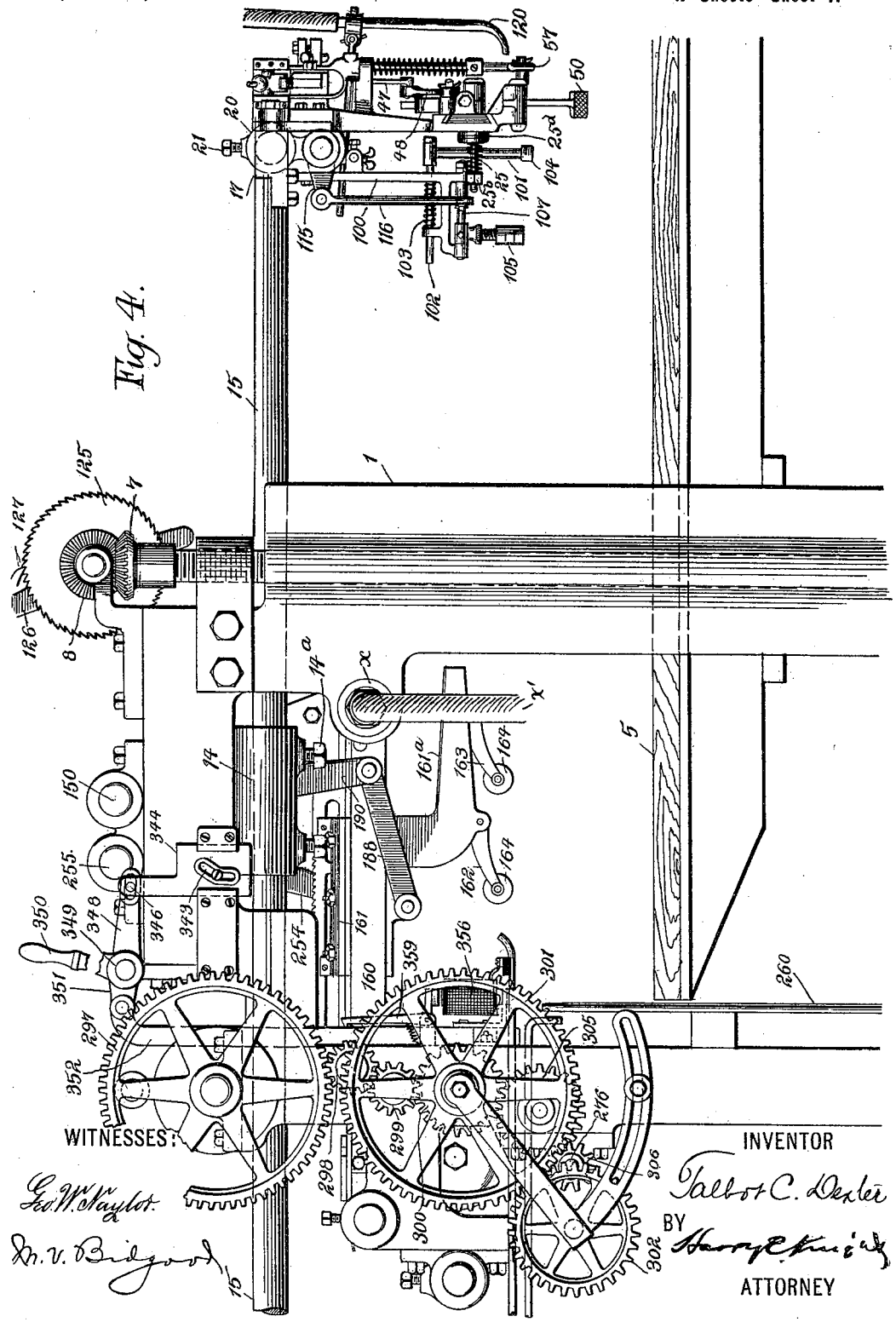

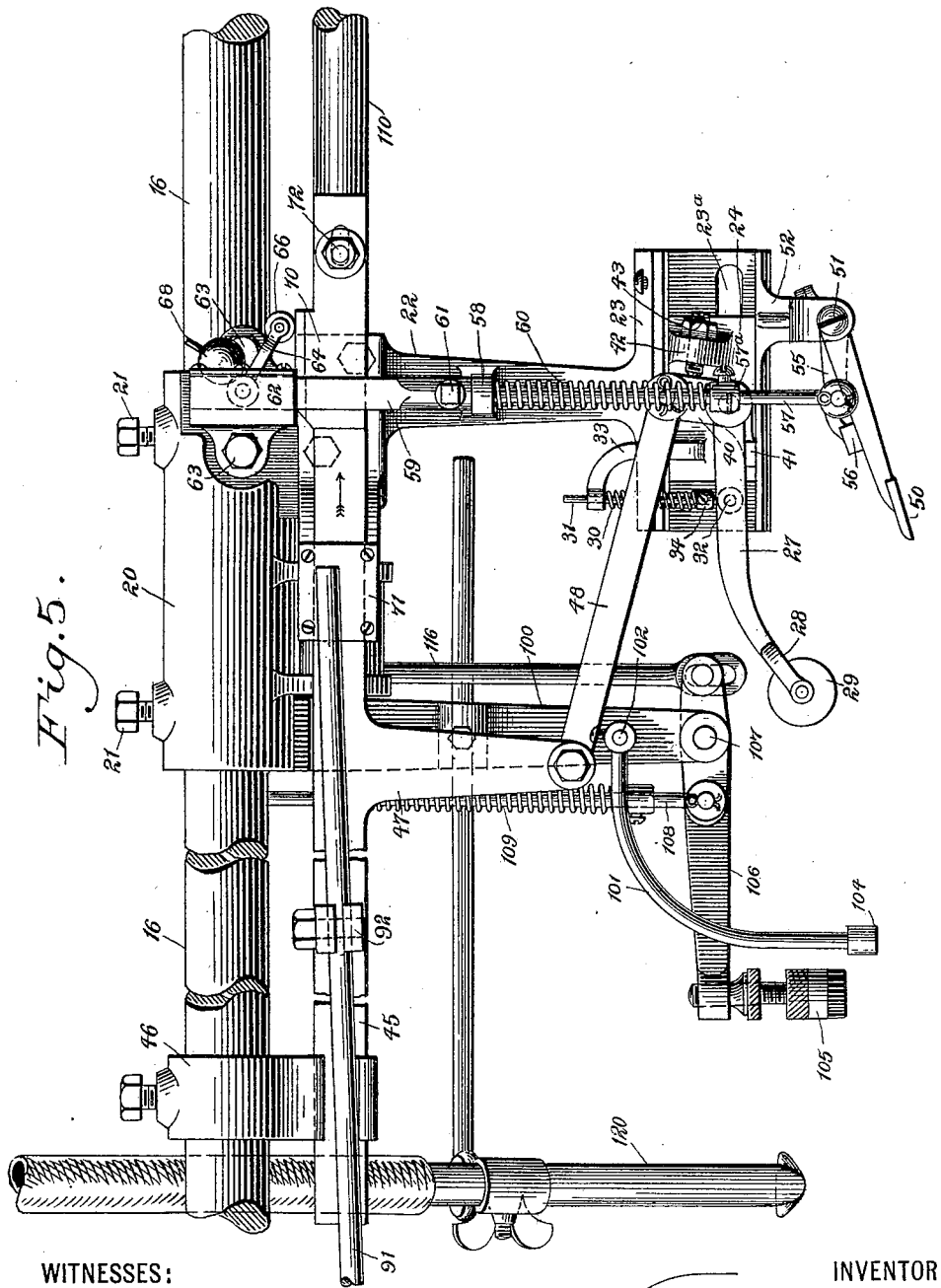

No. 623,770. Patented Apr. 25, 1899.
T. C. DEXTER.
PAPER FEEDING MACHINE.
(Application filed Dec. 14, 1897.)
(No Model.) 17 Sheets—Sheet 6.
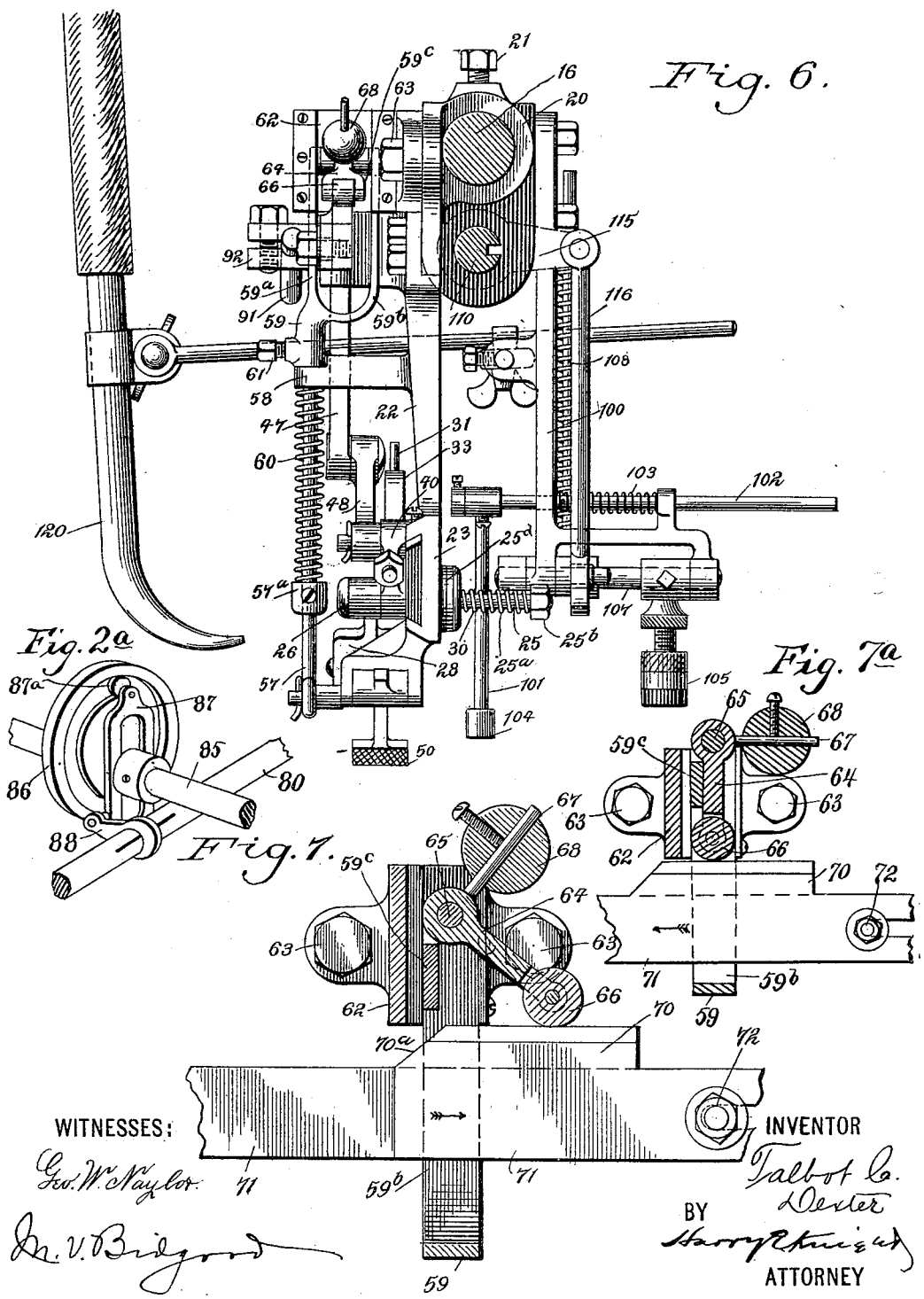
WITNESSES:
Geo. W. Naylor.
M. V. Bidgood.
INVENTOR
Talbot C. Dexter
BY Harry R. Knight
ATTORNEY No. 623,770. Patented Apr. 25, 1899.
T. C. DEXTER.
PAPER FEEDING MACHINE.
(Application filed Dec. 14, 1897.)
(No Model.) 17 Sheets—Sheet 7.

WITNESSES: INVENTOR
Talbot C. Dexter
BY
Harry —
ATTORNEY

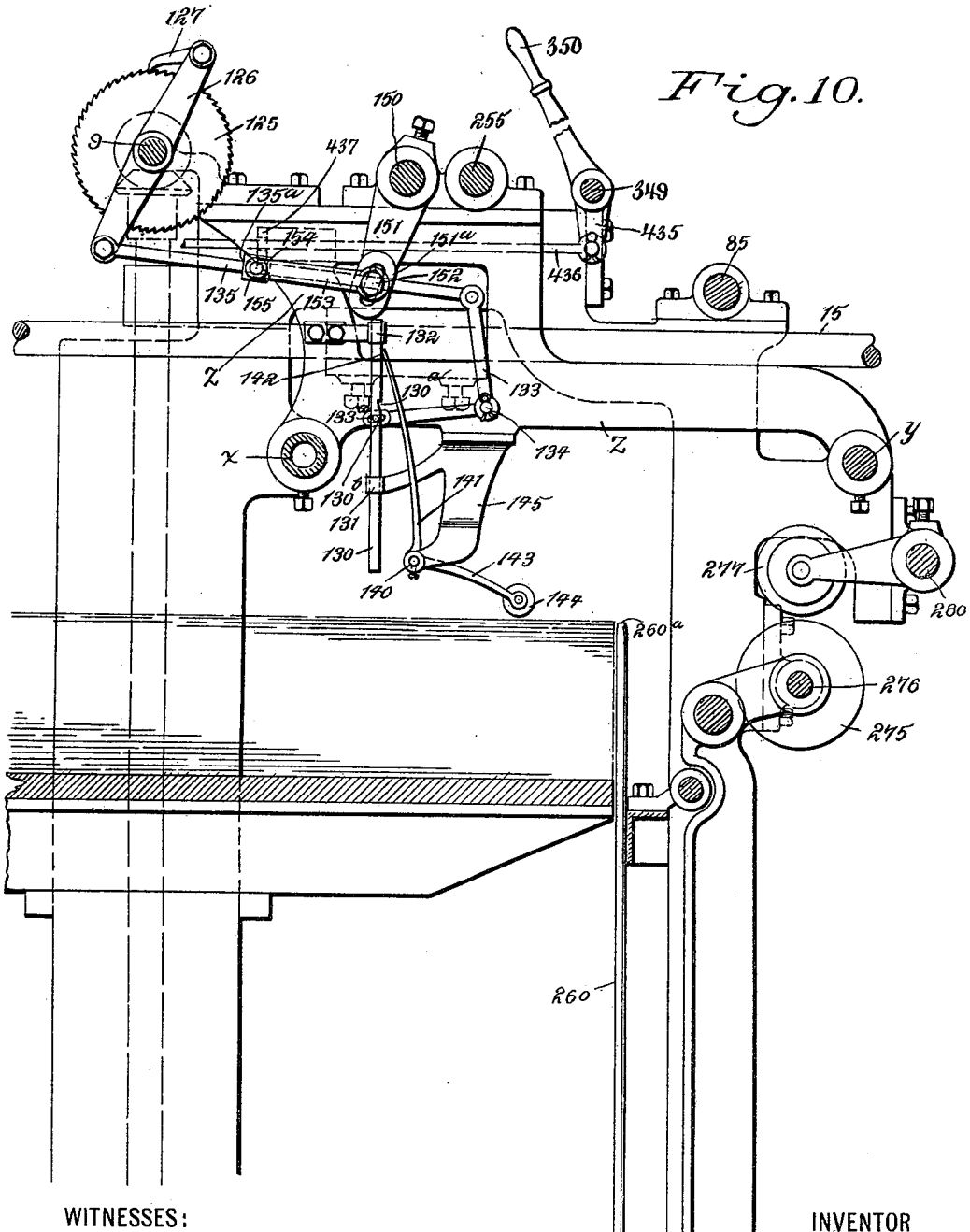

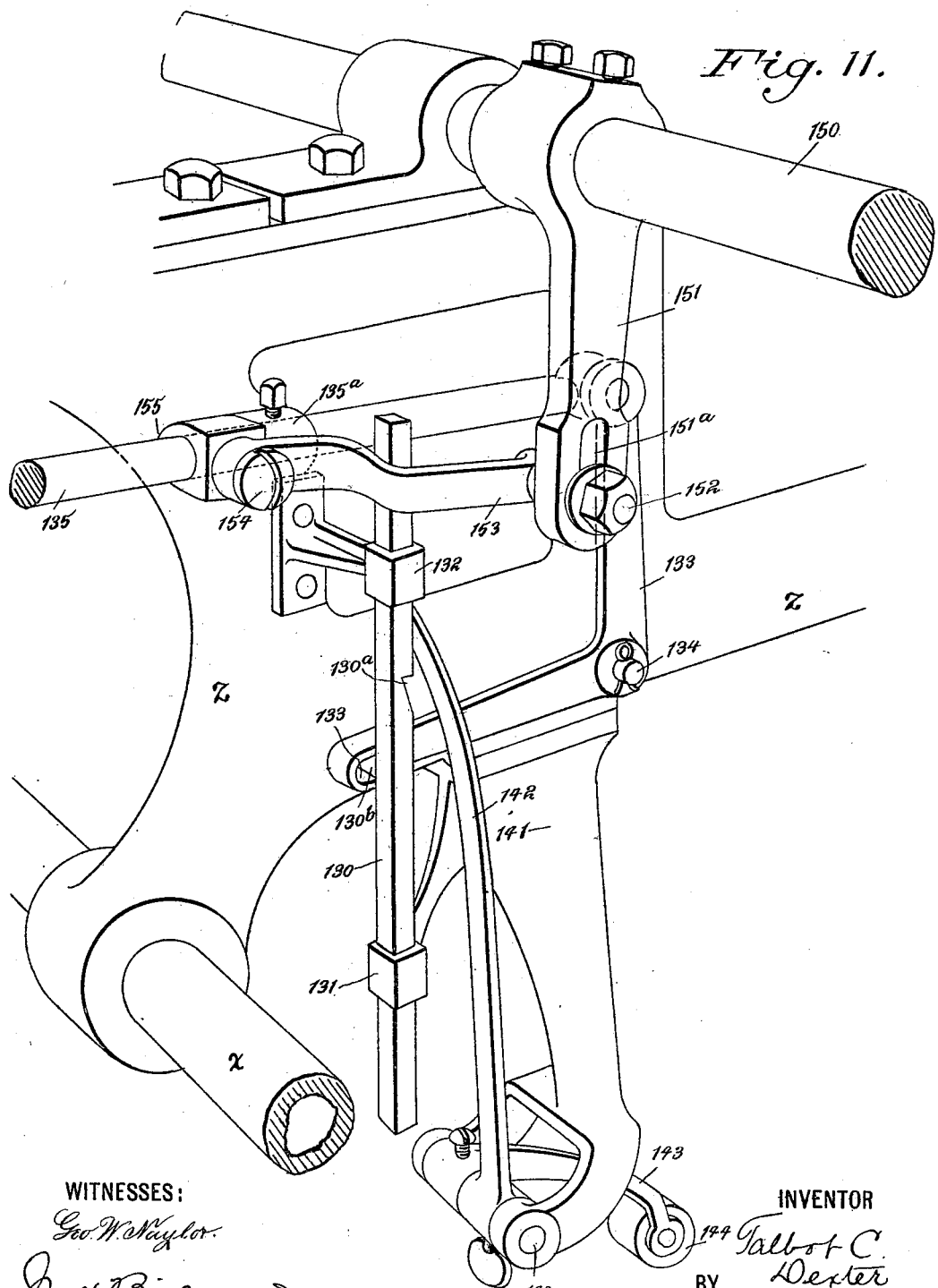

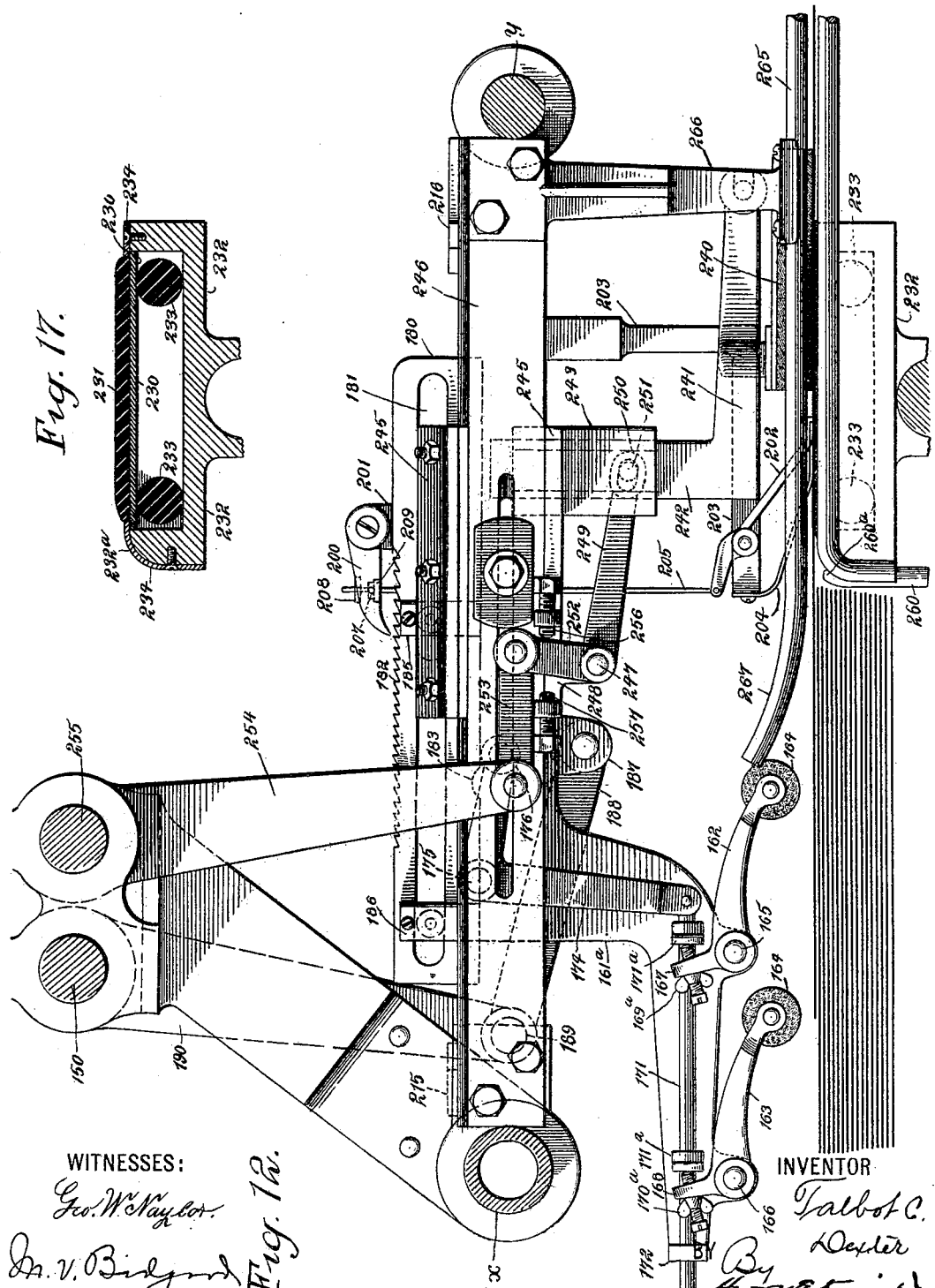

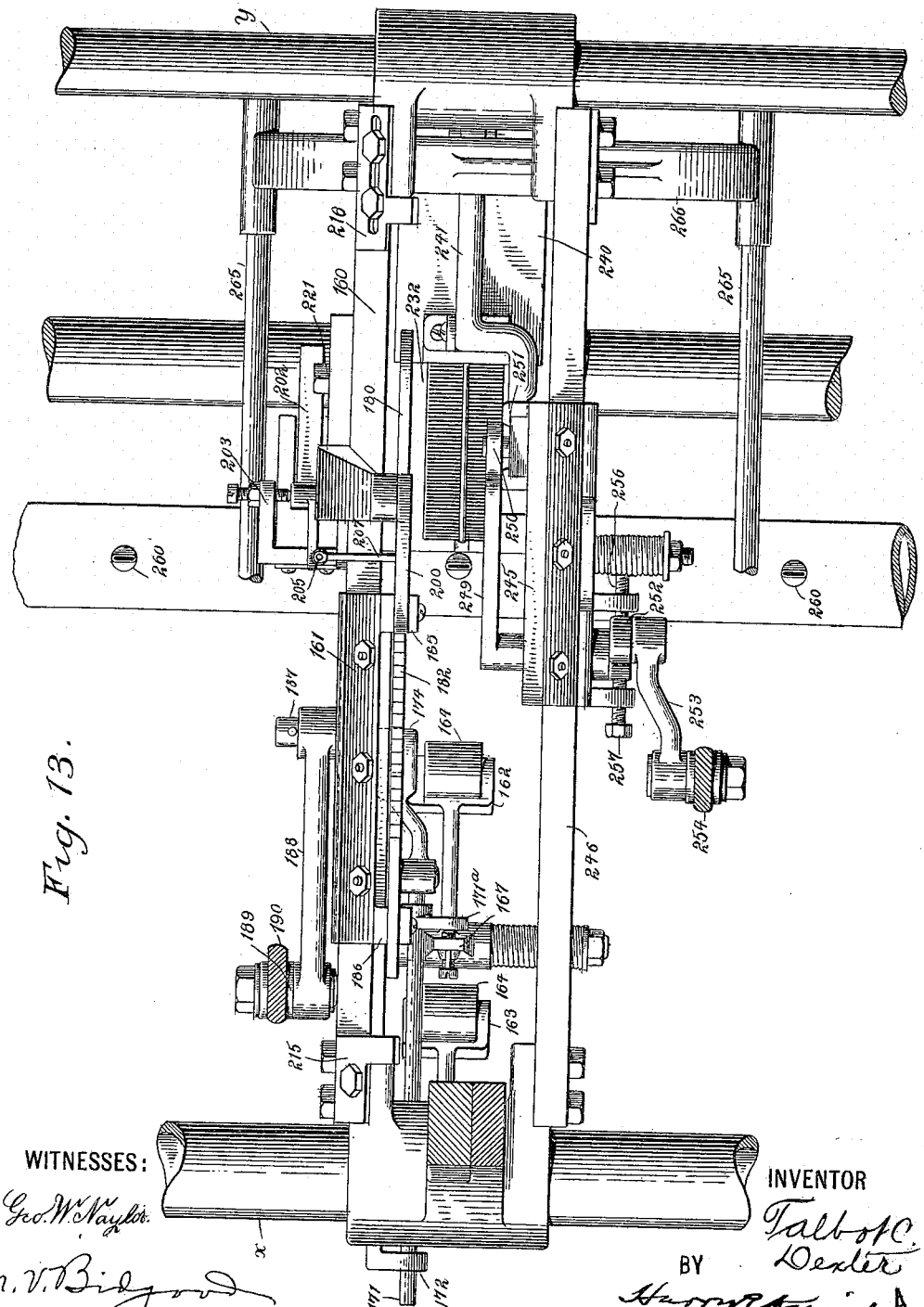

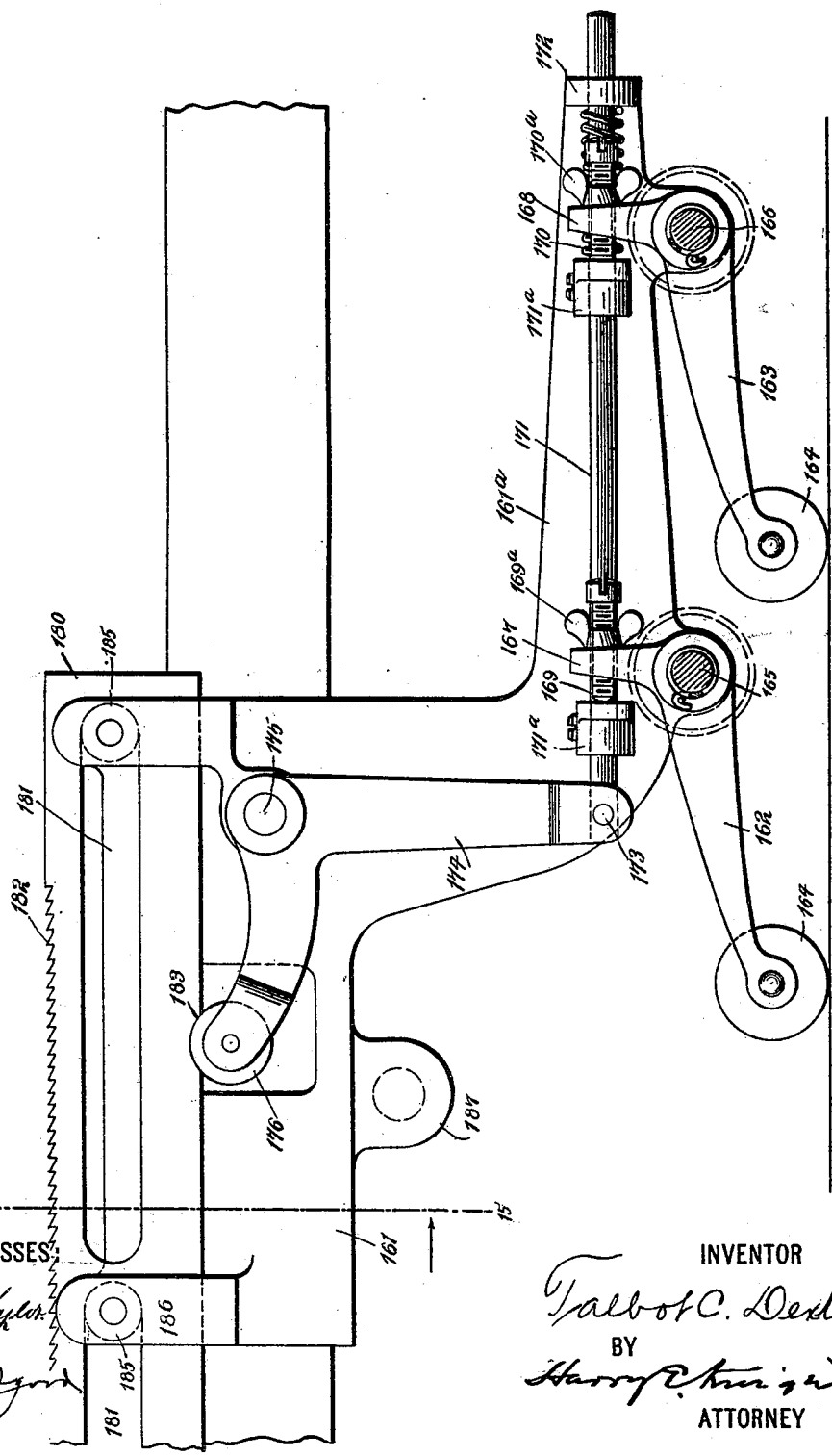

No. 623,770. Patented Apr. 25, 1899.
T. C. DEXTER.
PAPER FEEDING MACHINE.
(Application filed Dec. 14, 1897.)
(No Model.)
17 Sheets—Sheet 13.
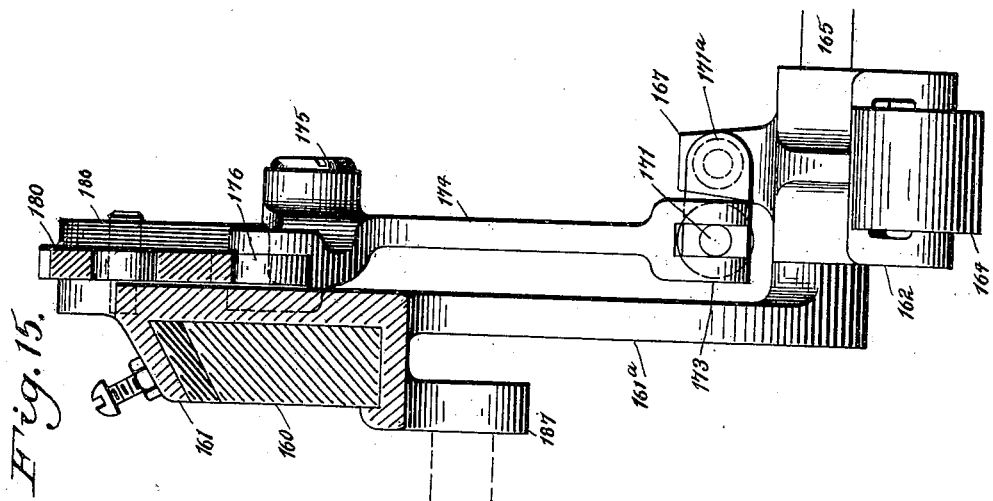
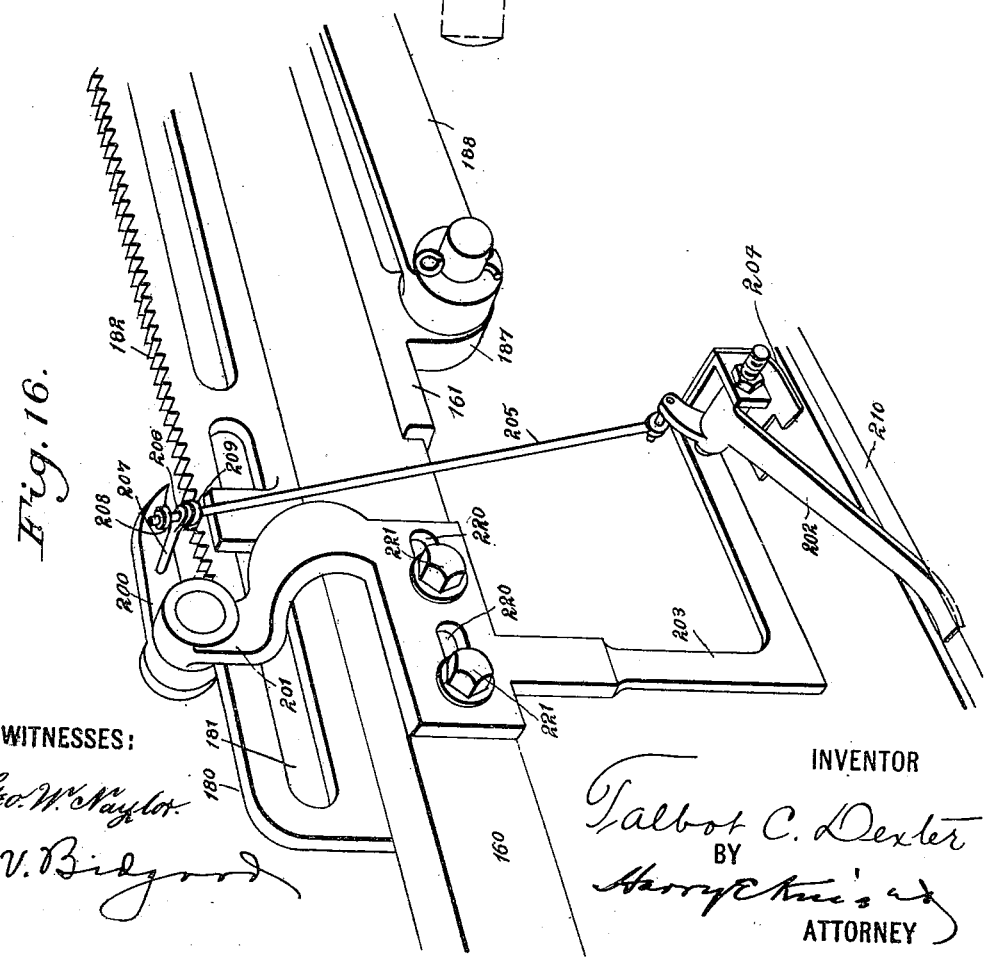
WITNESSES:
INVENTOR
Talbot C. Dexter
BY
Harry E. Knight
ATTORNEY

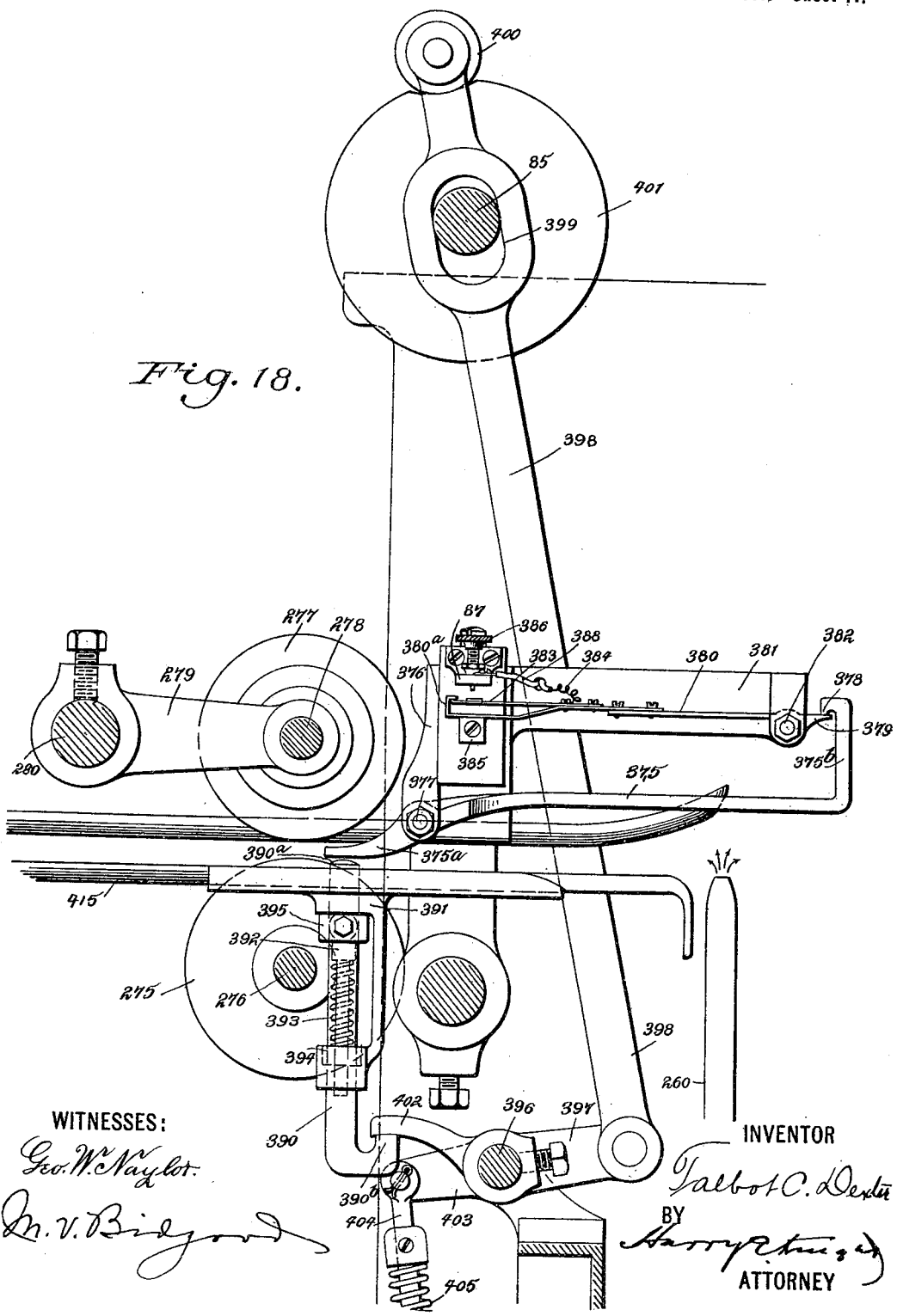

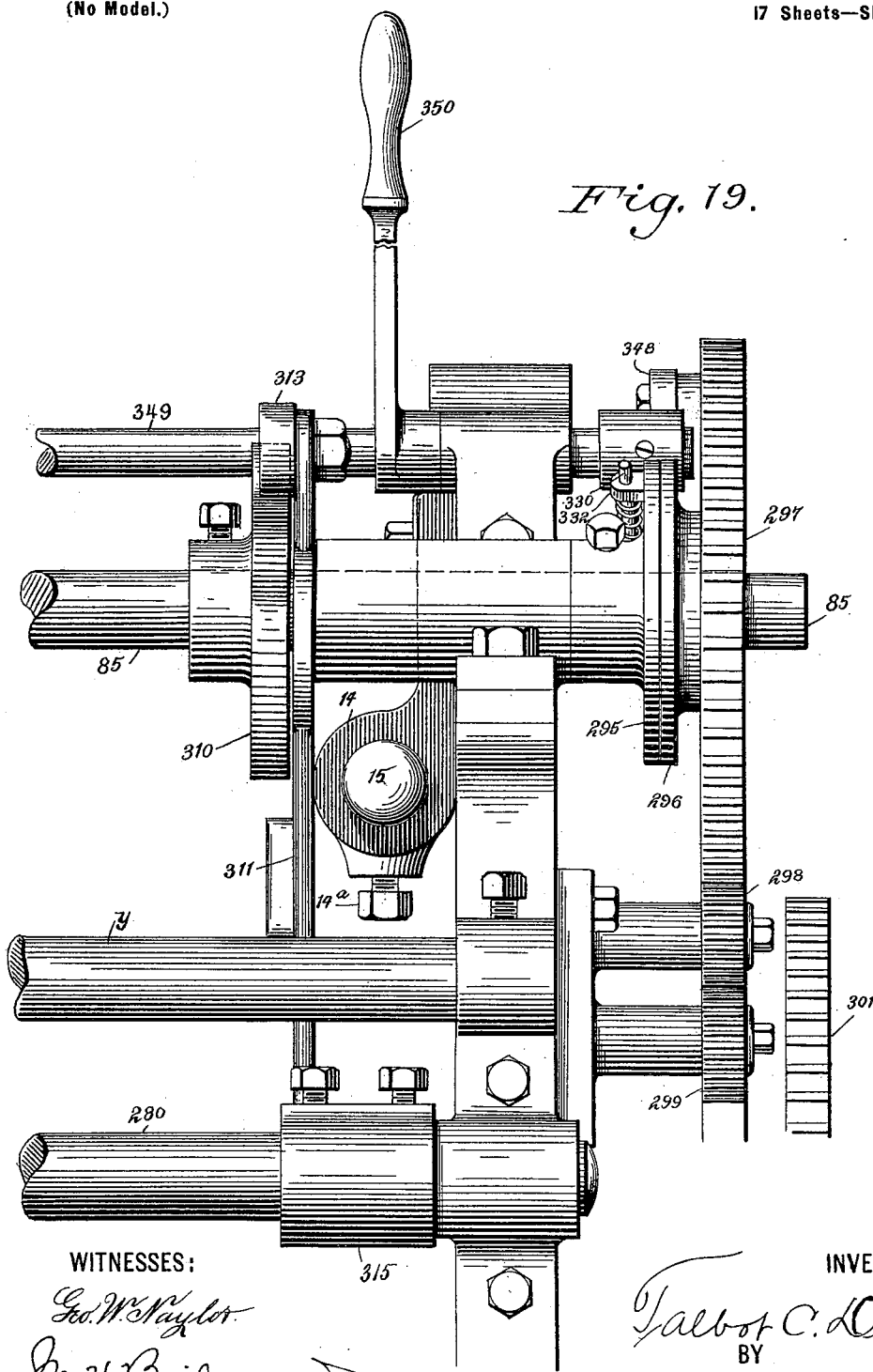

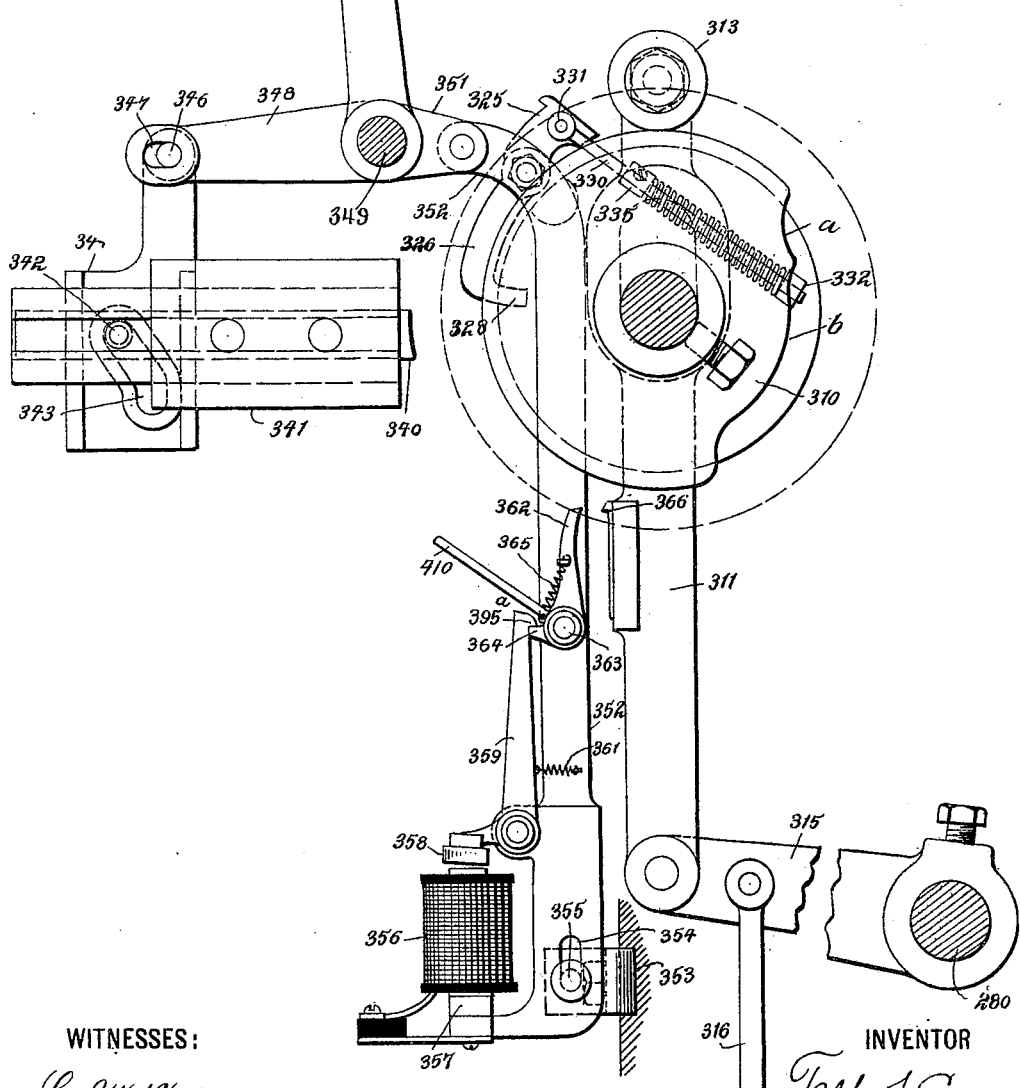

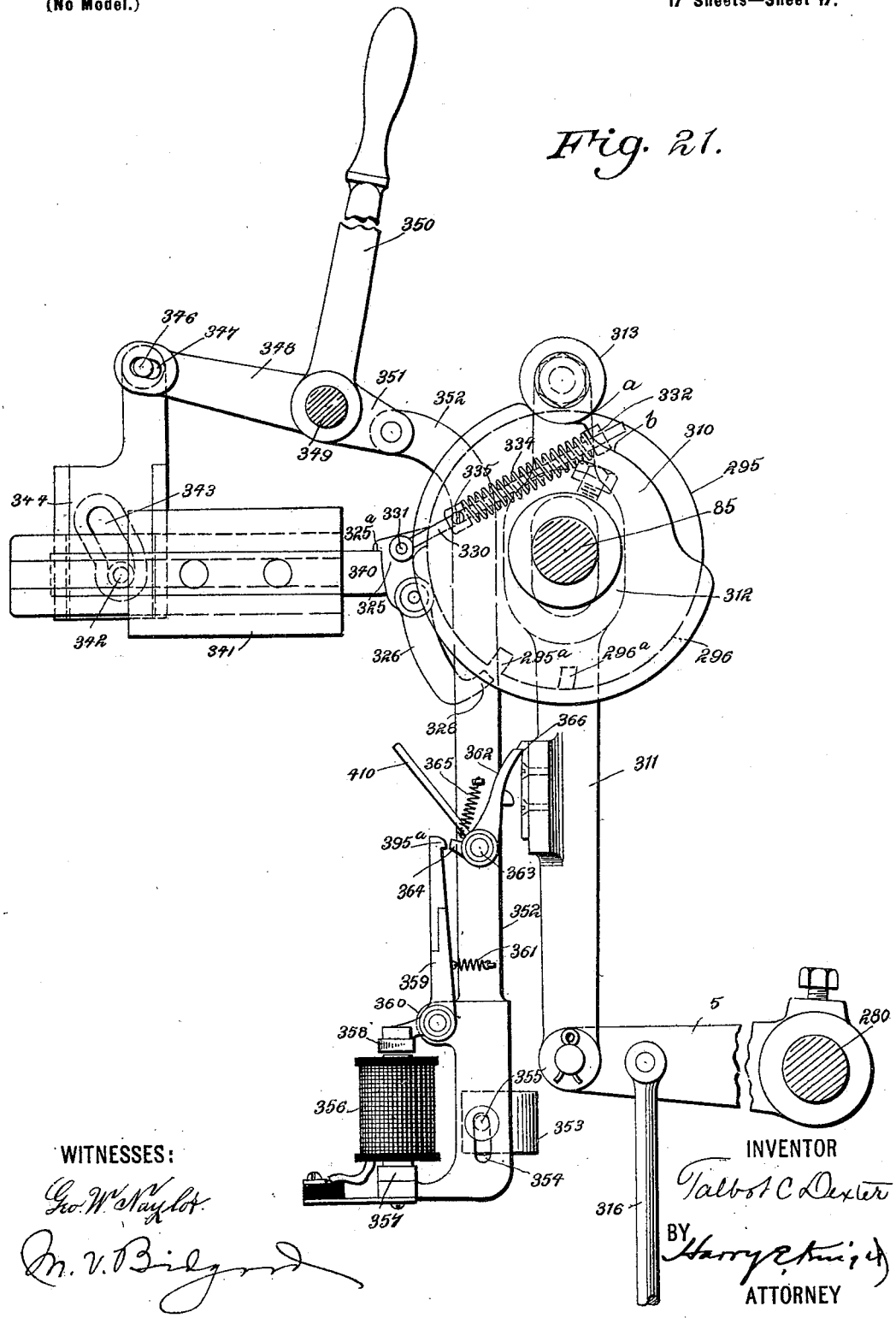

UNITED STATES PATENT OFFICE.

TALBOT C. DEXTER, OF PEARL RIVER, NEW YORK.

PAPER-FEEDING MACHINE.

SPECIFICATION forming part of Letters Patent No. 623,770, dated April 25, 1899.

Application filed December 14, 1897. Serial No. 661,818. (No model.)

*To all whom it may concern:*

Be it known that I, TALBOT C. DEXTER, a citizen of the United States, residing at Pearl River, county of Rockland, and State of New York, have invented certain new and useful Improvements in Paper-Feeding Machines, of which the following is a full, clear, and exact description.

My present invention relates to improvements in the type of paper-feeding machine illustrated in my application filed December 28, 1896, Serial No. 617,263, in which the successive sheets of paper in an adjustably-supported pile are buckled and separated from the pile and then fed off from the pile to a printing-press, paper folding or ruling machine, or other machine designed to operate upon the paper.

The object of my present invention is to simplify the structure and improve the operation of the essential parts of this type of feeder.

My invention relates, first, to improvements in sheet-buckling devices. The chief novelty in my present form of sheet-buckling devices consists in the construction and arrangement of the working parts of the buckler mechanism to adapt them to be operated by a novel reciprocating sliding cam movement, the reciprocating sliding cam being suitably connected with an oscillating shaft driven from the operating mechanism of the machine. The holding-down finger of the buckler is pivotally mounted upon a suitable stationary support and engaged by a spring-actuated device which comprises a vertically-movable rod connected with an arm which engages the holding-down finger and having a surrounding spiral spring for forcing said arm into engagement with said holding-down finger and carrying at its upper end a pivoted dog which is operated upon by the sliding cam. When the cam moves in one direction, the spring-pressed arm is elevated away from the holding-down finger by reason of the engagement of the cam with the dog, and when the cam moves in the opposite direction said dog is automatically released to allow the spring-pressure to be again applied to the holding-down finger. The buckler-finger proper consists of a reciprocating vertically-moving spring-pressed finger connected with the reciprocating bar by which the sliding cam is operated. I arrange a buckling mechanism at each side of the pile adjacent to the rear end and I couple the two reciprocating operating-bars at the center of the machine by means of two coupled levers, one of which is oscillated from a shaft extending from the power-shaft of the machine. By this system of coupling-levers the two sets of buckling devices are simultaneously operated for buckling both rear corners of a sheet at the same time. The sheet-buckling mechanism covered by my present application differs from the buckling mechanism heretofore employed in this type of paper-feeding machine in that the operation of the buckler-finger and the control of the spring-pressure upon the holding-down finger has been previously accomplished by means of rotary shafts and cams operating through links and levers. The present form of buckling mechanism is simpler in construction and superior in operation to the old forms of devices.

My invention relates, secondly, to a spring-pressed rod or arm resting constantly upon the top of the pile adjacent to the buckling mechanism. The rod or arm is preferably provided with a rubber tip, which engages the top sheet of the pile. When the buckling-finger operates, the sheet is buckled against said rod or arm and is then passed from the pile by the operation of the feeding-off devices, the rubber-tipped rod or arm serving to retard or hold back any chance underlying sheets which may have been buckled with the top sheet and which would otherwise pass forward with the top sheet under the action of the feeding-off devices. Incidental to this part of my invention to further assist in the holding back of any chance underlying sheets I provide a rubber-faced holding block or shoe, which is intermittently brought into engagement with the top of the pile of sheets just after the feeding-off devices have operated, so as to firmly engage the sheet directly beneath the shifted top sheet the moment the sheet-delivering mechanism engages said top sheet for passing it from the machine.

My invention relates, thirdly, to an improved and simplified form of automatic table-elevating mechanism. This table-elevating mechanism is similar to but simpler than the form of said mechanism covered by my application above referred to. In the present form of this mechanism I do away with the oscillating hood or shield and control directly the oscillation of the feeding-pawl, which operates upon the ratchet-wheel of the transversely-extending elevating-shaft. The pawl is journaled upon an oscillating arm, which is connected through the medium of a rod and bell-crank lever with the vertically-sliding controlling gage-rod, said gage-rod being normally held in elevated position by the engagement of the dog formed upon another bell-crank lever pivoted to the machine-frame and carrying at its lower end a freely-journaled roller resting constantly upon the top of the pile of paper. The rod which connects the oscillating pawl-supporting arm and bell-crank lever is provided with an adjustable tappet, which is engaged by a sliding tappet carried by the power rock-arm. When the pile of paper is at its normal height, the pressure of the pile upon the roller will hold the dog of the second-named bell-crank lever into engagement with the notch in the gage-rod, holding said gage-rod in elevated position and the connected first-named bell-crank lever, connecting-rod, and oscillating pawl-carrying arm in inoperative position. When the parts are in this position, the adjustable tappet on the connecting-rod cannot be engaged by the tappet of the power rock-arm sufficiently to operate the table-elevating ratchet-wheel, though the tappets do engage sufficiently at each stroke to slightly release the dog from the notch in the gage-rod in case the pile has been reduced sufficiently to allow the dog to fall out of the notch. If the top of the pile falls below normal, the gage-rod is released and is allowed to fall to its lowest position, carrying the pawl-supporting arm and connecting-rod into operative position in readiness to be actuated by the tappet on the power rock-arm.

My invention relates, fourthly, to an improved feeding-off mechanism and an automatic mechanical controlling device therefor actuated by the sheets fed from the machine. In this part of my machine I employ, as formerly, the reciprocating carriage supporting the relatively-movable rack-bar for controlling the position of the feed-fingers with relation to the pile of sheets, but I have rearranged the feed-fingers so as to control their position by means of a single controlling-arm actuated by the cam-face of the rack-bar; and I have done away with the electric tripping device formerly employed and have substituted a mechanical tripper for controlling the position of the rack-bar in the carriage. The mechanical trip comprises a tripping-finger supported in the path of the sheets, a dog journaled to a stationary part of the machine above the rack-bar, and a mechanical "lost-motion" connection between the tripper and dog to cause the latter to fall into engagement with the rack-bar when the former is tripped or elevated by a passing sheet for causing the rack-bar to be shifted in the carriage and elevate the feeding-fingers from the pile. The mechanical connection between the tripper and dog must have some provision for lost motion in order that the dog will not cause the tripper to bind upon the sheet when the carriage is moving rearwardly and the dog playing over the teeth of the rack-bar. This mechanical connection with provision for lost motion may be a rod connected with the tripper and passing loosely through a hole in a pin projecting from the dog and having tappets above and below the pin, or said connection may be some other lost-motion connection within the skill of mechanics.

My invention relates, fifthly, to an improved form of sheet-calipering device which is, as far as I am aware, broadly new. Heretofore it has been common to construct sheet-calipering devices of two members capable of relative adjustment toward and away from each other in order to set them to caliper any thickness of sheets to be passed through the machine, one of said members being capable of an additional movement, usually in a transverse direction, for actuating some form of throw-out mechanism which will arrest the operation of the machine when an improper thickness of sheets passes the calipering device. My present form of calipering device differs fundamentally from all previous forms of such devices known to me in that I provide two calipering members which are capable of being intermittently moved relatively toward and away from each other for intermittently closing upon a passing sheet and calipering it. If the thickness of the sheet or sheets which are passing at the moment the calipering device acts is thicker than the maximum to which the device has been adjusted, said calipering device will immediately detect this fact and automatically actuate the throw-out mechanism. The preferred embodiment of this essentially novel form of calipering device comprises two members supported normally with a sufficient space between them for the free passage of the sheets, suitable connecting devices between one of said members and the throw-out mechanism of the machine, a spring device for the other of said members tending to close said other member upon the first-named member with a yielding pressure, and a suitable controlling operating mechanism which normally restrains the tendency of the spring-actuated member to close and which intermittently allows said spring-actuated member to operate under the action of its spring for calipering a sheet. My improved sheet-calipering device is preferably arranged as near as possible to the sheet-delivery mechanism of the feeding-machine in order that the several devices of the machine will have ample opportunity to act upon the sheets, and I prefer to have the calipering device actuated by the operating device of the delivery mechanism (usually in the form of drop-rollers) or by devices directly connected or geared thereto in order that the delivery mechanism may be stopped before feeding off the sheets which have tripped the caliper.

My invention relates, sixthly, to an improved form of throw-out mechanism actuated by said calipering device for arresting the operation of the machine. The throw-out mechanism comprises a suitable clutch gearing the working parts of the machine to the power-shaft, a bolt adapted to release the clutch and arrest the operation of the machine, and a shipping-lever controlling the position of said bolt. The shipping-lever is provided with a hand-lever for manually operating it and an automatic device adapted to be actuated by the calipering device above referred to. The automatic device is preferably combined with the sheet-delivery or drop-roller operating mechanism and comprises a pivoted dog journaled upon a bar connected with the shipping-lever, a latch engaging the dog for holding it in inoperative position, an electromagnetic device for tripping the latch under the control of the calipering device, and a shoulder formed upon one of the bars of the drop-roller mechanism and adapted to engage the dog for operating the clutch when the calipering device trips the controlling-latch of the dog. The drop-roller mechanism is constructed as heretofore with the exception of the shape of the cam which controls the drop of the rollers. In my improved form of mechanism I provide the cam with a double drop, the initial part of the drop being for the purpose of throwing out the clutch of the machine in case the clutch-controlling device has been tripped by the caliper, while the second part of the drop is to allow the drop-rollers to fall into contact with the lower stationary rollers, with which they coöperate. The initial drop in the cam is not sufficient to allow the drop-rollers to come into contact with their lower stationary rollers, and if the clutch has been thrown out the machine will immediately be stopped and the drop-rollers will therefore not engage the sheet or sheets which have tripped the controlling device, and said sheets will not be fed from the machine to any great extent.

My invention relates, seventhly, to a novel form of upright front guides for the pile of sheets. The novelty in this part of my invention consists in forming the front guides of a series of vertically-extending air-pipes suitably connected with an air-blast apparatus and having their upper blast ends approximately on a level with the plane of feed of the sheets. The front guides or air-tubes are arranged between the pile and the sheet-separators (the pile being arranged against the guides) and serve to raise the front edges of the successive sheets as they are passed to the separator-beds, thereby preventing the front edges of the sheets being rammed against the edges of the separator-beds. In connection with these air-blast tubes I provide rods above the plane of feed to confine the sheets against the air-blast and allow them to move vertically only so far as necessary to avoid conflict with the edges of the separator-beds.

My invention relates, further, to other features of novelty in construction and arrangement, which, together with the above-named main features, will now be described with reference to the accompanying drawings and will afterward be particularly described with reference to their patentable novelty in the annexed claims.

Figure 9:
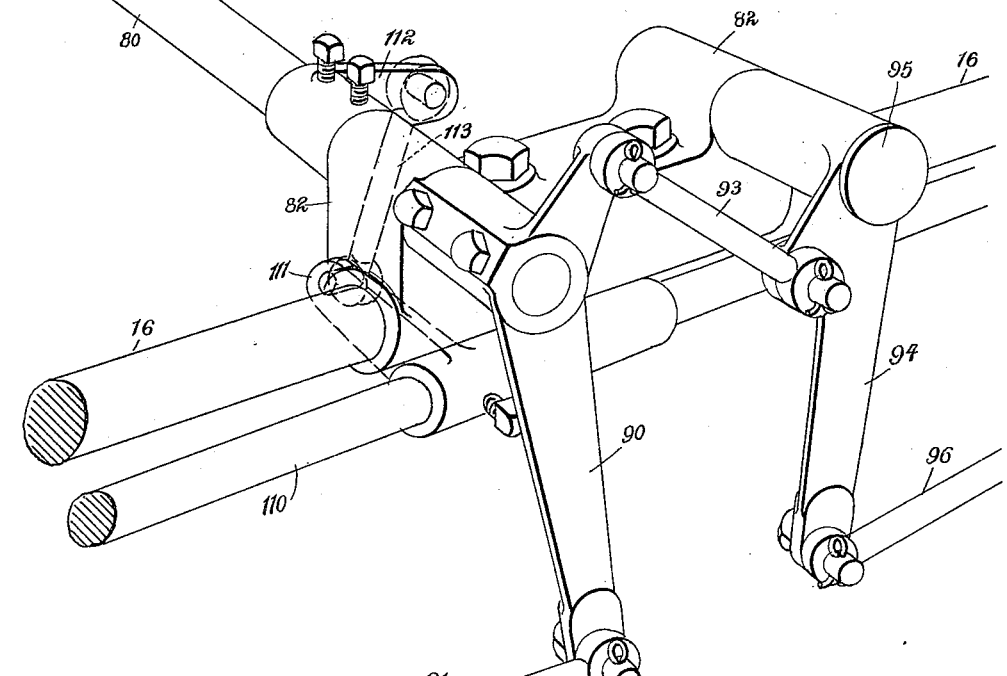

In said drawings, Figure 1 is a diagrammatic representation of the type of feeding-machine to which my present improvements are particularly applicable. Fig. 2 is a plan view of such a machine having my improvements applied thereto. Fig. 2$^a$ is a detail perspective view showing operative connection between main shaft and buckler-operating shaft. Fig. 3 is a side elevation of the right-hand side of said machine. Fig. 4 is a side elevation of the left-hand side of said machine. Fig. 5 is a detail side elevation of one of the sheet-buckling devices. Fig. 6 is a detail sectional end elevation of the same. Fig. 7 is a detail vertical sectional view illustrating one of the controlling and operating devices of the holding-down finger. Fig. 7$^a$ is a similar detail view showing parts in different position. Fig. 8 is a detail rear end elevation of a feeding-machine, partly in diagram, representing the system of coupled operating-levers for imparting simultaneous movements to the two sets of buckling devices at the opposite sides of the pile of sheets. Fig. 9 is a perspective view illustrating said operating-lever mechanism of the bucklers. Fig. 10 is a partial central vertical sectional view of the machine, illustrating in side elevation the improved automatically-controlled table-elevating mechanism. Fig. 11 is a perspective view of the automatic controlling parts of the same. Fig. 12 is a detail longitudinal sectional view illustrating my improved automatically-controlled feeding-off devices and the coöperating separating devices. Fig. 13 is a horizontal sectional view of the mechanism shown in Fig. 12. Fig. 14 is a detail side elevation of one of the feeding-off devices. Fig. 15 is a transverse sectional view taken on the line 15 15 of Fig. 14. Fig. 16 is a detail perspective view illustrating the automatic tripping device actuated by the passing sheets to control the operation of the feeding-off devices. Fig. 17 is a detail longitudinal sectional view illustrating the preferred structure of one of the lower separator-pads. Fig. 18 is a detail vertical sectional elevation illustrating my improved sheet-calipering mechanism which controls the automatic throw-out of the machine. Fig. 19 is a detail plan view of one corner of the machine, illustrating the automatic throw-out mechanism. Fig. 20 is a detail vertical sectional elevation of the automatic throw-out mechanism, illustrating the same with the parts in the position they assume when the clutch is engaged and the machine running. Fig. 21 is a similar view illustrating the parts in the position they assume immediately after the device has been tripped and the operation of the machine arrested.

The machine-frame may be of any suitable construction to properly support the mechanisms hereinafter described.

1 1 are the main side frame-pieces, which are suitably braced to form a rigid frame by means of the transversely-extending frame pieces and rods, $x$ being the transversely-extending hollow bar or pipe, which serves as an air-pipe as well as a brace, $y$ being a transverse brace, and $z$ being a central longitudinally-extending frame-piece supported upon bars $x$ and $y$ and having bearings for centrally supporting the transverse operating-shafts 9, 150, and 255. The arrangement of the parts of the frame is clearly shown in Figs. 2, 3, 4, 10, 11, and 13 and will be more fully understood from the detailed description of the operating parts now to be given. The hollow frame-bar or air-pipe $x$ is designed to be connected with any suitable air-blowing device through pipe $x$.

5 is the vertical movable paper-supporting table, upon which is piled the paper P. The paper-supporting table operates within suitable vertically-extending guideways of usual construction and is provided with suitably-threaded ears or lugs, (not shown,) through which pass the vertical elevating-screws 6, journaled in the side frames of the machine. Keyed to the upper ends of the screws 6 are the bevel cog-gears 7, with which mesh the similar bevel cog-gears 8, keyed to the ends of the transverse shaft 9, said shaft 9 being journaled in suitable bearings upon the top of the machine-frame and provided near its center with a ratchet-wheel 125, by which the table is elevated. To automatically control the elevation of the paper-supporting table, I provide suitable automatic mechanism regulated by the height of a pile of sheets, which mechanism will be hereinafter specifically described.

Supported over the rear end of the pile of sheets are two sets of sheet-buckling mechanisms for effecting a preliminary separation of the sheets from the pile preparatory to feeding said sheets from the machine. I will describe but one of these structures, as they are exact duplicates.

15 15 are rigid bars extending rearwardly from the main frame of the machine at each side thereof, said bars being adjustably supported in sockets 14, secured to the side frames of the machine.

14$^a$ indicates set-screws threaded into the sockets 14 and engaging the rigid bars 15 for supporting them in any desired adjusted position.

16 is a rigid buckler-supporting bar supported upon brackets 17, attached to the ends of bars 15. The bar 16 extends transversely of the machine above the pile-supporting table and is adapted to support the adjustably-mounted sheet-buckling mechanisms and their allied parts.

20 is a sleeve adjustably mounted upon the transverse supporting-bar 16, and 21 21 are set-screws seated in the sleeve 20 and engaging the bar 16 for securing sleeve 20 and the parts mounted thereon in any desired adjusted position transversely of the machine. Depending from the sleeve 20 is a rigid bracket-arm 22, supporting at its lower end a horizontal guide-bracket 23, in which is formed a guide track or way upon which slides the reciprocating buckler-carriage 24.

The sliding carriage 24 has projecting out from its rear face a rigidly-secured bolt 25, carrying a head 26 at its outer end.

27 is a buckling-finger having a forward bifurcated end 28, in which is rigidly clamped the rubber-faced buckling-roll 29. The buckler-finger 27 is loosely journaled upon the bolt 25 and is given a tendency to press against the top of the pile of paper by means of the spiral spring 30, surrounding a rod 31, which is pivoted to the buckler-finger at 32 and slides through an opening in the upper ends of the bracket-arm 33, extending up from the carriage 24 of the buckler. The upper end of the spiral spring 30 engages the bracket-arm 33, while its lower end engages an adjustable collar 34 upon the rod 31, by means of which adjustable collar the downward spring-pressure of the buckling-finger upon the pile can be regulated.

40 is a bell-crank lever loosely journaled upon the bolt 25 between the buckler-finger 27 and its sliding carriage 24, and 41 is a right-angled projection on the bell-crank lever 40, which extends under the spring-pressed buckling-finger 27 and engages with said finger for elevating it against the action of its spring 30.

42 is a lug formed integral with the sliding carriage 24, and 43 is an adjustable stop seated in said lug 42 and adapted to engage the upright arm of bell-crank lever 40 for limiting its rearward movement when the buckling-finger is elevated from the surface of the pile. The forward movement of bell-crank lever 40 is limited by the engagement of the buckling-finger with the pile.

45 is one of a pair of reciprocating operating-bars, which is slidingly mounted in guideways formed upon or projecting from the adjustable sleeve 20 and bracket 46.

47 is an integral arm depending from the bar 45, and 48 is a connecting-link journaled at one end to the arm 47 and at its other end to the bell-crank lever 40, which controls the operation of the buckling-finger.

The bolt 25 also projects forwardly from the buckler-carriage 24 and extends through a slot 23$^a$ of the casting 23. Loosely mounted upon the bolt 25 is a leather-faced brake 25$^d$, which is held in frictional engagement with the face of casting 23 by means of a spiral spring 25$^a$, adjustably secured by means of a nut 25ᵇ. This brake overcomes the initial tendency of the buckler-carriage to move and exerts sufficient resistance to insure the moving of the buckler-finger into or out of engagement with the top sheet of the pile before the buckler-carriage is reciprocated.

50 is the holding-down finger, pivotally mounted at 51 upon a bracket-arm 52, extending from the casting 23. Journaled upon the same bolt 51 is an arm 55, formed with a shoulder 56, which engages the upper edge of the holding-down finger 50 and has pivoted to it a vertically-extending rod 57, which rod 57 extends through a guide-bracket 58 and is adjustably connected to the lower end of a vertically-reciprocating bar 59. The rod 57 carries an adjustable collar 57ᵃ and supports a surrounding spiral spring 60, which engages the collar 57ᵃ at its lower end and the bracket 58 at its upper end, the purpose of which spring-pressed arm is to exert the proper spring-pressure upon the holding-down finger for holding the pile of sheets intact after a sheet has been buckled and during the time it is being fed from the pile.

The bar 59 is adjustably secured to the upper end of rod 57 by means of a set-screw 61, which is threaded into the wall of the socket formed at the lower end of said bar 59. The upper end of bar 59 is formed of U shape, as shown in Fig. 6 of the drawings—that is, it has two vertically-extending arms 59ᵃ and 59ᵇ, connected by a stop-plate 59ᶜ, which arms are guided in suitable grooves formed in the yoke or bracket 62, which incloses both arms. The yoke or bracket 62 is secured to the face of the sleeve 20 by means of bolts 63, and said yoke or bracket is formed with an open face at one side for the operation of the arm or dog 64, which is journaled upon a pin 65, extending between the two arms 59ᵃ and 59ᵇ and confined against movement in one direction by stop-plate 59ᶜ. The arm or dog 64 has a bifurcated lower end, in which is journaled an antifriction-roller 66. From the upper part of arm or dog 64 projects a pin 67, upon which is adjustably mounted a small weight 68 for holding the dog 64 into operative engagement with its operating-cam 70.

70 is a lineally-reciprocating sliding cam adjustably connected to a bar 71, which forms a part of or is attached to the reciprocating bar 45. The adjustable connection between reciprocating cam 70 and bar 71 is effected by means of pin-and-slot connection 72. The cam 70 and its supporting-bar 71 reciprocate in suitable guideways, the cam extending between the arms 59ᵃ and 59ᵇ beneath the pivoted arm or dog 64. Cam 70 has an inclined face 70ᵃ at one end to engage the antifriction-roll 66 and cause it to ride upon the cam 70 for moving bar 59 upwardly and relieving the holding-down finger of its spring-pressure. This operation takes places when the sliding cam moves inwardly, the parts assuming the position represented in Fig. 7ᵃ. At the limit of the outward inoperative movement of cam 70 the weight 68 moves the dog into vertical position in engagement with stop 59ᶜ, and then the cam 70 starts to move inwardly, engaging antifriction-roller 66 of the dog and moving bar 59 upwardly, the dog being held in its engaged position and prevented from moving inwardly on its pivot by reason of its engagement with stop 59ᶜ. The antifriction-roll 66 of the dog rides upon the cam until it is reached by the outer end of the cam, when it slips off and allows the spring-pressure to be immediately reapplied to the holding-down finger. This action takes place at the completion of the stroke of the buckling-finger after the top sheet has been withdrawn from under the holding-down finger. During the return stroke of the reciprocating cam the pivoted dog rides freely on the cam without changing the position of the spring device of the holding-down finger. Figs. 5, 6, and 7 show the position of the parts during the return stroke of the cam.

As above stated, I employ two sets of sheet-buckling devices adjacent to the rear edge of the pile, and I will now describe the mechanism by which I impart the simultaneously relative movements to the parts of the buckling mechanisms.

Referring particularly to Figs. 2, 8, and 9, it will be observed that an oscillatory shaft 80 extends centrally of the machine from front to back, it being journaled adjacent to the front of the machine in a bearing 81 and at the rear of the machine in a bearing 82, supported upon the transverse bar 16. 85 is the main power-shaft of the machine, extending entirely across the machine adjacent to its front end, said power-shaft being driven in a manner hereinafter referred to. 86 is a grooved cam keyed to the shaft 85 adjacent to its center, and 87 is a loop-connecting link embracing or guided upon the power-shaft 85 and carrying an antifriction-roll 87ᵃ, which works in the groove of cam 86. The loop-connecting link is journaled to the end of a rock-arm 88, which has spline-and-groove connection with the rock-shaft 80, by which said rock-shaft 80 is oscillated. This operative connection between shaft 85 and shaft 80 is shown in detail in Fig. 2ᵃ. At the rear end of the oscillating shaft 80 is keyed a double-armed lever 90, having one arm connected, through rod 91 and adjustable bracket 92, with one of the reciprocating operating-bars 45 which operates one of the bucklers. The other arm of the lever 90 is connected, through link 93, with an oscillating lever 94, journaled at 95 and connected through a rod 96 and adjustable device 92 with the other reciprocating operating-bar 45 for operating the buckler at the opposite side of the machine. It will be observed that by means of the rock-shaft 80 and coupled levers 90 and 94 the two sets of buckling mechanisms are simultaneously operated.

100 is a bracket-arm depending from the adjustable sleeve 20, and 101 is a curved rod or bar keyed to a rock-shaft 102, which is journaled in the bracket-arm 100 and is provided with a spiral tension-spring 103, by which the rod 101 is held in constant engagement with the top sheet of the pile. At the lower end of rod 101 I prefer to attach a small rubber block 104, which block acts in the nature of a separator. I employ a spring-pressed rod or bar 101 at each side of the machine, and during the operation of the buckling mechanisms the sheets are buckled against said spring-pressed rod. Immediately after the buckling of the sheets the feeding-off mechanisms, hereinafter referred to, carry the sheet from the pile, dragging the top sheet from under the rubber tips of spring-pressed rods 101, said rubber tips engaging any under sheets which may have been buckled with the top sheet and preventing said under sheets from passing forward with the top sheet.

105 is a rubber-faced holding shoe or block adjustably mounted in the end of a lever 106, pivoted at 107 to the lower end of bracket-arm 100.

108 is a rod pivoted to lever 106 and carrying a spiral spring 109, which bears at its lower end against an adjustable collar on rod 108 and at its upper end against a stationary guide (not shown) through which the rod 108 passes.

110 is a rock-shaft carrying a rock-arm 111, which is coupled to a rock-arm 112, keyed to the oscillating shaft 80.

113 is a link which couples rock-arms 111 and 112.

The rock-shaft 110 is journaled in suitable brackets or sleeves supported upon the rigid shaft 16 and is provided with rock-arms 115 adjacent to the two sets of buckling mechanisms.

116 is a rod connecting one of the rock-arms 115 with the lower end of spring-pressed lever 106. It will be observed that by the oscillation of rock-shaft 110 the holding shoes or blocks 105 will be intermittently raised from and lowered into engagement with the pile of sheets. The mechanism is so timed that the two holding blocks or shoes will engage the pile the moment the buckling-fingers complete their forward buckling strokes, and at the same moment the drop-rollers or delivery mechanisms of the machine take the top separated sheet and pass it from the machine, the holding blocks or shoes in the meantime holding fast to the under sheets of the pile. The holding blocks or shoes are so adjusted that they will engage the pile just behind the rear edge of the top separated sheet.

120 refers to a number of air-blast tubes adjustably mounted upon suitable brackets in a manner well understood and having flexible tubular connection with the air-supply pipe $x$ of the frame, these tubes serving to blow air under the separated top sheet immediately after it has been buckled. I do not claim any novelty in these blast-tubes.

I will now proceed to describe my novel form of mechanism for automatically controlling the elevation of the pile of sheets.

As above explained, the transverse shaft 9 is suitably geared to the screws which elevate the pile-supporting table.

125 is a ratchet-wheel keyed centrally to the elevating-shaft 9.

126 is an oscillating arm or lever journaled upon shaft 9 and pivotally supporting at its upper end a pawl 127, which is in constant engagement with the ratchet-wheel.

130 is a vertically vibrating or reciprocating gage-rod sliding in stationary bearings 131 and 132.

$130^a$ is a notch cut in one face of the gage-rod 130.

133 is a bell-crank lever journaled at its elbow upon a stationary pin 134 and having its upright arm connected with the lower end of oscillating pawl-carrying arm 126 through means of a connecting-rod 135. The lower arm of the bell-crank lever 133 is formed with a slot $133^a$ in its end, which engages a pin $130^b$ on the rod 130. By means of this connection it will be observed that the arm 126 will oscillate when the rod 130 reciprocates.

140 is a rock-shaft having keyed to it a vertically-extending arm 141, formed with a dog 142 at its upper end, which is adapted to engage in the notch $130^a$ of the gage-rod 130. The rock-shaft 140 also has a rock-arm 143 keyed to it, which arm 143 supports in its lower end a freely-journaled antifriction-roller 144, which rests constantly upon the surface of the pile of sheets. The rock-shaft 140 is freely journaled in a stationary bracket 145, supported from central frame-piece $z$ above the pile of sheets, and the shaft 140, with its two rock-arms 141 and 143, constitutes a bell-crank lever.

150 is a rock-shaft journaled in the side frames 1 1 and central frame $z$ of the machine and operated in a manner hereinafter explained.

151 is a rock-arm keyed to shaft 150 and adjustably connected, by means of slot $151^a$ and a bolt 152, with one end of a link 153, which link 153 is pivotally connected at 154 to a sliding block or tappet 155, which is slidingly mounted upon the connecting-rod 135.

$135^a$ is an adjustably-secured tappet mounted upon rod 135. The pawl-supporting arm 126 and gage-rod 142 are operated by the engagement of sliding tappet 155 with secured tappet $135^a$ of rod 135. The weight of gage-rod 130 is sufficient to keep tappet $135^a$ in engagement with sliding tappet 155 as it is moved back and forth by the operating rock-arm 151 except when the dog 142 engages in notch $130^a$ and prevents the downward movement of gage-rod 130.

The operation of this automatically-controlled table-elevating mechanism will be clear with but a slight explanation. When the pile of sheets is at the proper working level, the dog 142 will be held into engagement with notch 130ª of gage-rod 130 by reason of the surface of the pile-supporting rock-arm 143. When the gage-rod 130 is held in elevated position, the pawl-supporting arm 126, connecting-rod 135, and bell-crank lever 133 will be held against movement, and consequently the tappet 135ª will not follow the sliding tappet 155, and hence the tappet 155 cannot impart any effective movement to these parts upon its return stroke. The tappet 135ª is, however, so adjusted with relation to the stroke of sliding tappet 155 that it will be engaged at the end of the forward stroke of the sliding tappet, so as to give gage-rod 130 a slight upward movement sufficient to allow the dog 142 to fall out of engagement with notch 130ª if the surface of the pile has fallen below the normal working level. If the surface of the pile has fallen below the working level, the dog 142 will be disengaged from notch 130ª by reason of the falling of rock-arm 143 with the pile, and the gage-rod 130 will move down to its lowest position, carrying the tappet 135ª back with the sliding tappet 155 and moving the pawl 127 over the ratchet-wheel. When this happens, the forward stroke of rock-arm 151 and tappet 155 will cause the pawl 127 to rotate shaft 9 a fraction of a revolution, and at the same time the gage-rod 130 is elevated. The pawl-carrying arm 126 will be oscillated and the gage-rod 130 vertically reciprocated in this way until the surface of the pile is again at the proper working level, when the dog 142 will be again forced into engagement with notch 130ª for holding the parts out of operation.

After the top sheet of the pile has been separated by the sheet-buckling device, as above described, the feeding-off devices take it for feeding it forward to the sheet-separating devices. For feeding a sheet from the pile I employ two sets of feeding devices arranged to operate longitudinally of the machine in parallel lines. This arrangement is the same as employed in my above-named application, Serial No. 617,263. I will describe but one of these two sets of feeding devices in my present application.

x and y are two of the transverse brace bars or rods forming parts of the frame of my machine.

160 is a track-bar suitably supported between the rods x and y.

161 is a reciprocating feeder-carriage supported upon the track-bar 160 and formed with a rearwardly-extending integral arm 161ª.

162 and 163 are the feed-fingers proper, carrying in their ends the rigidly-clamped rubber blocks 164 and journaled upon the pins 165 and 166, respectively, which pins are carried in the arm 161ª. Each of the fingers 162 and 163 is provided with a tension-spring arranged in any suitable manner—such, for instance, as in my above-named application, Serial No. 617,263. The feed-fingers 162 and 163 are formed with heels or lugs 167 and 168, in which are adjustably mounted the screws or pins 169 and 170. 169ª and 170ª are clamp-nuts threaded onto the screws or pins 169 and 170.

171 is a horizontally-extending controlling-rod passing freely through a guide-bracket 172 at one end and pivotally connected at its other end 173 to the lower end of a bell-crank lever 174, journaled at 175 upon the feeder-carriage 161.

171ª are tappets adjustably secured to the rod 171 in position to engage the ends of screws or pins 169 and 170 for controlling the position of the feed-fingers 162 and 163 with relation to the pile of sheets.

176 is an antifriction-roller journaled in one arm of the bell-crank lever 174 and bearing upon the lower cam-face of the rack-bar 180. The rack-bar 180 is formed with two longitudinally-extending slots 181, rack-teeth 182 on its upper surface, and a single semicircular recess 183 upon its lower surface. When the rack-bar 180 is in the proper position in the carriage, the depressing-springs of the feed-fingers force the rubber blocks of the fingers into engagement with the surface of the pile, the antifriction-roller 176 engaging the semicircular recess 183.

185 are antifriction-rollers journaled between integral lugs 186 of the feeder-carriage and working in the longitudinal slots 181 of the rack-bar for confining the rack-bar within its proper limits.

187 is a lug depending from the carriage 161, and 188 is a connecting-rod journaled to lug 187 at one end and to the lower end 189 of the rock-arm 190 at its other end, the rock-arm 190 being keyed to the rock-shaft 150, above referred to. It will be observed that by reason of the oscillation of shaft 150 the feeder-carriage will be reciprocated forward and back above the pile of sheets, the position of the feed-fingers with relation to the surface of the pile depending upon the position of the controlling rack-bar. The rack-bar is automatically controlled by the position of the sheet being fed off by the mechanism which I will now describe.

The means for automatically shifting the rack-bar 180 in the carriage to lift the friction-blocks 164 of the feed-fingers from the surface of the pile comprise a dog or pawl 200, journaled upon a stationary bracket 201 above the rack-bar, and a tripper 202, journaled upon a stationary bracket 203 directly above the plane of feed of the sheets and connected with the dog 200 through a lost-motion mechanical connection. This lost-motion connection consists, preferably, of a rod 205, journaled at its lower end to the tripper 202 and extending upwardly through an opening 206, formed in a pin 207, extending from one side of the dog 200, said rod 205 carrying adjustable tappets 208 and 209 above and below pin 207. The tripper 202 rests normally in a longitudinal groove 210 slightly below the plane of feed of the sheets.

204 is a guide-plate depending from bracket-arm 203 and extending forwardly a short distance under tripper 202 to guide the front edge of the sheet under the tripper.

When a sheet is fed forward by the feeding-off devices, its forward edge engages the tripper 202 and lifts its forward end and pulls rod 205 downwardly for allowing the dog 202 to fall into engagement with the rack-teeth 182. This operation happens before the completion of the forward stroke of the feeder-carriage, and therefore the rack-bar will be held against motion while the feeder-carriage completes its forward stroke, which will cause the rack-bar to be shifted longitudinally in the carriage, throwing antifriction-roll 176 out of recess 183 and thereby rocking lever 174 and shifting rod 171 for elevating the feed-fingers from the surface of the paper. The feed-fingers are held in this elevated position until the completion of their return or backward stroke, when the rack-bar 180 will be engaged by an adjustable stop 215, mounted on the track-bar 160, which stop 215 serves to shift the rack-bar into operative position again for allowing the feed-fingers to again come into contact with the surface of the pile in readiness to feed another sheet upon its next forward stroke.

To make sure of the elevation of the feed-fingers from the paper for the rearward stroke of the carriage in case the automatic devices have not been tripped by a sheet, I provide an adjustable stop 216, which will engage the end of the rack-bar at the completion of the forward stroke of the carriage if the rack-bar has not already been shifted by the automatic tripping device.

I would call particular attention to the above-described automatic tripping device with the lost-motion mechanical connection. I believe this device to be broadly new. Its importance will be apparent when it is considered that the electrical attachment usually employed is done away with and the device is greatly simplified and perfected by reason of this. To enable the ready adjustment of the tripper 202 and the controlled pawl or dog 200, I have constructed the brackets 201 and 203 of a single connected piece, which is formed with slots 220, in which engage bolts 221 for securing the double bracket to the side of the track-bar 160.

To further obviate the possibility of two sheets of paper being fed from the pile, I arrange at the delivery end of the machine two sets of sheet-separating devices, each set being arranged approximately in front of one of the feeding-off mechanisms. These sheet-separating devices are in the main like the same devices covered by my above-named application, Serial No. 617,263, the main feature of difference being in the construction of the lower sheet-retarding bed. Each of the sheet-retarding beds consists of a flat plate or backing 230, carrying a sheet or strip of rubber 231, and mounted in a suitable casting 232 upon rubber cushions or springs 233.

234 are plates or flanges secured to the casting 232 and engaging the backing-plate 230 for confining the vertically-yielding sheet-retarding bed within the recess in casting 232. The rear edge of casting 232 adjacent to the pile of sheets is curved, as indicated at 232$^a$, to assist the travel of the forward edges of the sheets from the pile onto the retarding-bed. The rubber blocks or springs 233 support the sheet-retarding bed in the plane of feed of the sheets, but yields sufficiently to allow for any unevenness in thickness of the sheets when they are engaged by the reciprocating separating-pads.

Coöperating with each of the sheet-retarding beds just described is a reciprocating rubber separating-pad 240, which is mounted upon the forwardly-extending arm 241 of a vertically-movable sliding bar 242. The bar 242 slides vertically in a guide-bracket 243, formed integral with a carriage 245, which is mounted to travel longitudinally of the machine upon a track-bar 246.

247 is a short rock-shaft journaled in a lug 248 of the carriage, and 249 is a rock-arm keyed to one end of shaft 247 and formed with a slotted forward end 250, which engages a pin 251, extending from one face of the vertically-movable sliding bar 242.

252 is a rock-arm keyed to the opposite end of shaft 247, and 253 is a connecting rod or bar connecting the upper end of rock-arm 252 with the lower end of a driving rock-arm 254, keyed to a rock-shaft 255, journaled in the side frames of the machine and receiving power, as hereinafter described.

256 and 257 are oppositely-arranged adjustable bolts threaded into lugs integral with the carriage 245 and adapted to confine the motion of the rock-arm 252, and consequently the vertical movement of the separator-pad 240, carried by the arm 241 of bar 242.

258 is a brake-block operating as described in my above-named application for overcoming the initial tendency of the carriage 245 to move in order that the motion of the driving rock-arm 254 will first actuate the sliding bar 242 for throwing the separator-pad 240 into or out of the plane of feed of the sheets. It will be observed that the initial motion of rock-arm 254 will move rock-arm 252, and as soon as said rock-arm engages one of the screws 256 or 257 the carriage 245 will be moved forward or back. Each separator therefore comprises a vertically-yielding sheet-retarding bed upon which the sheets are received from the pile and a sheet-separating pad having a rectangular course or travel—that is, the separator-pad reciprocates forwardly in the plane of feed of the sheets, then moves vertically out of the plane of feed, then backwardly in its elevated plane, and finally downwardly into the plane of feed for a new feeding operation.

It sometimes happens that the forward edges of the sheets of paper are jammed against the rear edges of the separators. By forming the rear edges of the separators rounded, as above explained, this jamming of the sheets is partly overcome. To further obviate this objection, I have devised a novel form of front guides for the pile of sheets, which guides comprise vertically-extending air-blast tubes 260, having their outlet or blast ends 260ª just below the plane of feed of the sheets. Suitable air-blowing apparatus is placed in communication with the air-tubes 260 and so connected with the operating mechanism of the machine that every time a sheet is fed forward from the pile to the separator-beds a series of blasts of air will be directed upwardly under the sheet as it passes from the pile. This will tend to lift the forward edge of the sheet and prevent it from coming in contact with the rear edge of the separator-beds, and hence entirely obviate any danger of jamming the forward edges of the sheets against the separators. To properly confine the sheets as they are acted upon by the blasts of upward currents of air, I provide a series of horizontally-extending paper-guide rods 265, supported from bracket-arms 266 and having the rear curved ends 267 supported just above the pile of sheets.

In the operation of my improved machine the sheets are first separated by the buckling devices, then fed forward to the separators by the feeding-off devices, and the separator-pads then operate to give the top sheet a forward impulse for separating it from any chance underlying sheets and feeding it into the grip of the sheet-delivery devices. The sheet-delivery devices comprise, preferably, a series of lower rollers 275, keyed to a constantly-rotating shaft 276, and a series of drop-rollers 277, journaled upon journal-pins 278, which are supported in the forward ends of rock-arms 279, keyed to a rock-shaft 280. The rock-shaft 280 is intermittently rocked for dropping the rollers 277 into peripheral engagement with the rolls 275 for engaging the sheet and passing it rapidly from the machine. The operation of the drop-roller rock-shaft 280 will presently be described.

Referring now particularly to Figs. 2, 3, 4, and 19, it will be observed that the power-shaft 85 extends across the top of the machine from side to side and carries in addition to the cam 86, above referred to, for operating the bucklers the grooved cams 290 and 291, which operate through the connecting-rods 292 and 293, respectively, for rocking shafts 150 and 255. At the left-hand end of shaft 85 is keyed the fixed clutch member 295, while loosely mounted upon the shaft 85 adjacent to the fixed clutch member is a loose clutch member 296, formed integral with or suitably attached to a cog-gear 297. The gear 297 is driven by a train of gear 298, 299, 300, 301, and 302 from any suitable power-shaft. The shaft 276 of the lower constantly-operating feed-rolls 275 is driven from the gear 300, which meshes with gear 305, which drives the gear 306 on shaft 276. The structure of the automatic clutch will be presently fully explained.

Just inside of the left-hand side frame is mounted a cam-disk 310 upon the shaft 85. The cam 310 is formed with a double drop or depression, (indicated by the reference-letters $a$ and $b$ in Fig. 21.)

311 is a vertically-extending connecting-bar formed with a loop 312, which embraces and guides upon the shaft 85.

313 is an antifriction-roll journaled to the upper end of bar 311 and working upon the periphery of controlling-cam 310. The lower end of bar 311 is journaled to a rock-arm 315, keyed to the drop-roller-controlling rock-shaft 280.

316 is a rod extending from rock-arm 315 and adapted to be actuated by a suitable spring, (not shown,) which tends to throw the drop-rollers 277 down into engagement with rollers 275 when the cam 310 allows it.

Referring now to Figs. 19, 20, and 21, I will describe the structure of my improved automatic clutch.

325 is a head forming part of a clutch-lever 326, which is journaled at 327 to a lug formed integral with the fixed member 295 of the clutch, the clutch-lever 326 being formed at its forward end with a dog 328, adapted to engage the registering grooves 295ª and 296ª for clutching the fixed member 295 of the shaft 85 to the loose member 296, which is constantly driven by the gearing above described.

330 is a rod journaled at 331 to head 325 and extending through a lug 332 on the fixed clutch member 295.

334 is a spiral spring surrounding rod 330 and confined between the lug 332 and an adjustable collar 335, attached to rod 330. The spring 334 tends to throw the clutch-dog 328 into engagement with the clutch-notches when unrestrained. The head 325 is formed with an integral lug or shoulder 325ª, with which a sliding bolt 340 may engage. The bolt 340 is supported in a suitable guideway 341 and is provided with a pin 342, which works in an angular cam-groove 343, formed in a vertically-sliding cam-bar 344, which bar is mounted in suitable vertical guides at the side of the machine and is connected by means of pin 346 and slot 347 with a rock-arm 348, keyed to a rock-shaft 349, which is operated by the shipping-lever 350.

By the mechanism already described the machine may be thrown out by the operation of the hand-lever 350. The rock-shaft 349 extends from side to side of the machine, and adjacent to each side I provide a hand-lever 350, as shown in Fig. 2 of the drawings. Depending from the rock-shaft 349, as shown in Figs. 2 and 10 of the drawings, about midway between its ends, is keyed a rock-arm 435, to which is journaled an operating pull-and-thrust rod 436, which extends rearwardly through a bearing 437, attached to the central frame-piece $z$, and is formed at its rear end with a knob or handle 438. By this means the machine may be thrown out from either side at the front or from the rear.

For the purpose of automatically tripping the clutch for arresting the operation of the machine I provide an automatic mechanism under the control of an automatic calipering device, and I will now proceed to describe this mechanism, referring first to the controlled automatic part of the throw-out, which is actuated by the caliper.

351 is an arm projecting from rock-shaft 345 and having pivotally connected with it a shipping-bar 352, which depends from the rock-arm. The shipping-bar 352 is guided upon a block 353, by means of the slot 354 in the bar and the pin 355, attached to the block.

356 is an electromagnet mounted upon an insulated support 357, which is attached to the lower end of the shipping-bar 352.

358 is the armature of the electromagnet, which armature is attached to one arm of a rock-lever 359, pivoted to a lug 360 of the shipping-bar.

361 is a spiral spring tending to hold the armature 358 away from the electromagnet 356.

362 is a dog journaled at 363 upon the shipping-bar 352 and formed with a heel or lug 364, which is adapted to be engaged by a hook 395$^a$ on the armature-lever 395.

365 is a small spiral spring tending to throw the dog 362 to one side when released by the armature-lever 359.

366 is a lug or detent secured to one edge of the controlling-bar 311 of the drop-roller mechanism, the lug or detent 366 being in such position that it will engage the dog 365 when said dog is released by the armature-lever 359. If the electromagnet is energized by the automatic mechanism hereinafter referred to, the dog 365 will be released and will be engaged by the detent 366. This operation will take place just before the roller 313 reaches the first drop $a$ in its controlling-cam 310, and hence when the roller 313 allows the bar 311 to drop it will carry the shipping-bar 352 downwardly with it, which in turn will rock the rock-arm 348 and lift the cam-bar 344, so as to throw the bar 340 into the path of the head 325. This will release the clutch-dog 328 from the clutch-notches by reason of the cam-face of the head 325 and will positively arrest the rotation of the fixed member of the clutch by reason of the engagement with the shoulder 325$^a$. I provide the cam 310 with two drops in order that the operation of the machine will be arrested before the drop-rollers engage the sheet of improper thickness for carrying it from the machine. This result is due to the fact that the first drop $a$ is not sufficient to allow the drop-rollers to engage their stationary rollers, but is sufficient to actuate the automatic clutch. As the operation of the machine is positively arrested by the engagement of the bar 340 with shoulder 325$^a$, it will be clear that the drop-rollers cannot fall into operative position after the automatic clutch has been actuated.

Referring now to Fig. 18, I will describe the automatic calipering device by which I control the automatic clutch mechanism above described for arresting the operation of the machine. This calipering device is arranged to engage the sheets passing from the machine during a moment of rest just before said sheets are engaged by the sheet-delivery mechanism, which in the present instance comprises the drop-roller mechanism.

375 is a calipering-lever pivoted to a suitable bracket 376 upon a journal 377 and formed with a forwardly-extending calipering-nose 375$^a$. The lever 375 has an upwardly-projecting extension 375$^b$, formed with a heel or lug 378, which engages a rearwardly-extending heel 379 of a contact-lever 380, pivoted to a bracket-arm 381 upon a journal 382. The contact-lever 380 is provided at its forward end with a spring-contact 383, electrically connected to one of the circuit-wires 384, said spring contact-tongue being confined by the rigid rectangularly-bent portion 380$^a$ of the contact-lever.

385 is a stop for limiting the downward movement of the contact end of lever 380.

386 is an adjustable contact-screw supported in bracket 387 above the contact-tongue 383 and electrically connected with the other circuit-wire 388. The circuit-wires 384 and 388 are electrically connected with the electromagnet 356 of the automatic throw-out mechanism above referred to.

390 is a vertically-movable calipering-bolt supported with its upper rounded calipering end 390$^a$ just below the normal plane of feed of the sheets. The calipering-bolt 390 is supported in a suitable bracket 391 and is provided at one side with a rod 392, supporting the spiral spring 393. The spring 393 engages a shoulder on rod 392 at one end and a bracket 394 at its lower end for forcing the calipering-bolt 390 upwardly with a yielding pressure.

395 is a collar adjustably secured to the calipering-bolt 390 for limiting its upward movement.

396 is a rock-shaft provided with a rock-arm 397, from which extends an operating and controlling rod 398, provided near its upper end with a guide-loop 399, which guides upon the main power-shaft 85.

400 is an antifriction-roll journaled in the upper end of rod 398 and working upon the periphery of a simple cam 401, which is keyed to the power-shaft 85 near the right-hand side of the machine. The cam 401 has a single slight depression in it to allow the operation of the calipering device once during each revolution of the shaft.

402 is a rock-arm keyed to shaft 396 and engaging a heel or lug 390$^b$ of the spring-actuated calipering-bolt 390. 403 is another rock-arm keyed to shaft 396, and 404 is a rod pivoted to arm 403 and provided with an upwardly-acting spiral spring 405. The spring-actuated rod 404 holds the antifriction-roll 400 in working relation with its cam 401.

I prefer to have the brackets 376 and 391 connected by a suitable yoke at the side of the machine, (such as 376ª, shown in Fig. 2,) so that the two members of the sheet-calipering device can be accurately supported with relation to each other. Both members should be adjustable as a whole with relation to the plane of feed of the sheets in addition to their individual relative adjustment above explained. This adjustment of both members together with relation to the plane of feed is accomplished by adjustably mounting the yoke 376ª in any suitable manner. This adjustment is not shown.

The depression in cam 401, which allows the calipering device to operate, is so arranged with relation to the operating devices of the several parts of the machine that the calipering device will be allowed to act upon each sheet which passes from the pile just before the sheet-delivering drop-rollers operate upon the sheet. When a sheet reaches the calipering device, the drop in the cam allows the spring 393 to close the calipering-bolt 390 against the calipering-nose 375ª of the lever 375. If the sheet which is caught during a momentary pause for an instant has a greater thickness than the maximum to which the device has been adjusted, the lever 375 will be shifted under the action of the calipering-bolt far enough to make electric contact between spring-tongue 383 and contact-screw 386. The completion of this circuit will immediately energize electromagnet 356, which will release the dog 362 into engagement with the shoulder 366 of bar 311. This action takes place instantaneously a moment before the roll 313 of the drop-roller-controlling mechanism drops into the depression $a$ of its cam 310. If the automatic device has been tripped by the caliper, the falling of bar 311 will pull down the shipping-bar 352, causing the cam-bar 344 to be elevated and the throw-out bolt 340 to be thrown into the path of head 325 for first releasing dog 328 from the clutch-notches and then positively arresting the operation of the machine by its engagement with the shoulder 325ª. The working parts of the machine will therefore be arrested before the sheet leaves the pile, and it is a simple matter to remove the objectionable sheet or sheets and again start the machine by the hand-lever 350. It will be observed that the machine is arrested before the drop-rollers 277 engage the objectionable sheet or sheets.

The automatic calipering device comprises two relatively-movable members, which are adapted to close upon a sheet passing from the machine and caliper its thickness, one of said members being preferably spring-pressed and the other of said members being preferably in the form of a lever suitably connected with electrically-operated throw-out mechanism.

For resetting the electrically-controlled dog 362 after the machine has been tripped I provide a hand-lever 410, extending from dog 362. By the operation of lever 410 the dog 362 can be moved backwardly till its heel 364 engages the hook 395ª.

415 represents the lower horizontally-extending paper-guide rods which are supported in the plane of feed of the sheets.

The operation of the several parts of the machine when combined as illustrated and described above will be clear to those skilled in the art.

I would have it understood that I consider my machine operative without the tripping device for controlling the feed-regulating rack-bar, and I do not intend my claims to be limited to the tripping device except when it is specifically included. The rack-bar is automatically controlled by the stops which engage it at the ends of the stroke of the carriage in addition to the control of the tripper, and by the proper adjustment of these stops the operation of the feeder can be rendered accurate enough for many purposes. The addition of the tripper, however, improves the operation and renders the control of the feed perfectly accurate.

While I have shown means for adjusting the relation of the feed-fingers to the pile of sheets, I would have it understood that such adjustment is subject to the broad claims on this feature contained in my copending application filed June 24, 1898, Serial No. 684,347.

Having thus fully described my invention, the following is what I claim as new therein and desire to secure by Letters Patent:

1. In combination with a paper-feeding machine, two sets of sheet-buckling devices operating upon opposite sides of a pile of sheets, and comprising buckling-fingers and holding-down fingers, two oppositely-arranged lineally-reciprocating bars carrying cams and operating and controlling said two sets of sheet-buckling mechanisms, reciprocating cams secured to said bars and operating the holding-down fingers, a suitable driving-shaft, and suitable connecting operating devices connecting said lineally-reciprocating bars to the operating-shaft to cause them to simultaneously operate upon the opposite sides of the pile, substantially as set forth.

2. In combination with a paper-feeding machine, two oppositely-arranged reciprocating sheet-buckling fingers, two spring-pressed normally active holding-down fingers engaging the pile at opposite sides, two oppositely-arranged lineally-reciprocating bars, a driving-shaft connected with said reciprocating bars, reciprocating cams connected with said bars and operatively connected with the holding-down fingers and adapted to remove the spring-pressure from said holding-down fingers, substantially as and for the purpose set forth.

3. In combination with a paper-feeding machine, two sets of sheet-buckling devices operating upon opposite sides of a pile of sheets, and each set comprising a spring-pressed holding-down finger and a reciprocating sheet-buckling finger, two oppositely-operating lineally-reciprocating bars connected respectively to the reciprocating buckling-fingers, oppositely-operating lineally-reciprocating cams attached to said lineally-reciprocating bars and controlling and operating the respective holding-down fingers, a power-shaft, and suitable connecting mechanism connecting said lineally-reciprocating bars to said power-shaft, causing them to operate oppositely and effecting a simultaneous operation of the two sets of buckling mechanisms at the opposite sides of the pile, as set forth.

4. In combination with a paper-feeding machine, two sets of sheet-buckling mechanisms operating upon opposite sides of the pile of sheets, and each set comprising a spring-pressed holding-down finger and a reciprocating buckling-finger, two oppositely-operating lineally-reciprocating bars connected respectively with the two buckling-fingers, lineally-reciprocating cams connected with said lineally-reciprocating bars and controlling and operating the spring-pressed holding-down fingers, a pair of coupled rock-levers, a power-shaft geared to one of said rock-levers, and connecting-rods extending from said rock-levers and connected respectively to the oppositely-reciprocating bars, whereby said buckling mechanisms will be simultaneously operated at the opposite sides of the pile, substantially as set forth.

5. In combination with a paper-feeding machine, two sets of sheet-buckling mechanisms arranged at opposite sides of the pile of sheets and each comprising a reciprocating buckling-finger and a spring-pressed holding-down finger, two oppositely-operating lineally-reciprocating bars connected respectively to the two buckling-fingers, lineally-reciprocating cams connected with the reciprocating bars and controlling and operating said spring-pressed holding-down fingers, a pair of coupled rock-levers connected respectively to said oppositely-operating reciprocating bars, a power-shaft operating one of said coupled rock-levers, an intermittently-operating holding block or shoe adapted to be brought into contact with the top of the pile of sheets, and suitable mechanism connecting said holding block or shoe with the power-shaft, substantially as set forth.

6. In combination with a paper-feeding machine, a sheet-buckling device comprising a reciprocating buckling-finger, a holding-down finger, a vertically-movable spring-pressed rod engaging the holding-down finger, a dog journaled upon said vertically-movable rod, and a lineally-reciprocating cam engaging said dog for controlling the spring-pressure upon the holding-down finger, as set forth.

7. In combination with a paper-feeding machine, the sheet-buckling mechanism comprising a reciprocating buckling-finger and a spring-pressed holding-down finger, a lineally-reciprocating bar suitably connected with the buckling-finger, a reciprocating cam connected with said reciprocating bar, a dog pivoted to the spring device of the holding-down finger and operating upon said reciprocating cam to relieve the holding-down finger of pressure when the cam moves in one direction and to allow the reapplication of the spring-pressure when the cam moves in the opposite direction, substantially as set forth.

8. The combination, with a paper-feeding machine, of a sheet-buckling mechanism comprising a reciprocating buckling-finger, a lineally-reciprocating bar suitably connected with the buckling-finger for operating it, a holding-down finger, a vertically-movable spring-pressed rod engaging the holding-down finger, a dog journaled upon the vertically-movable rod and carrying an antifriction-roller, and a reciprocating cam connected with the reciprocating bar and supported in suitable bearings beneath the dog of the vertically-reciprocating rod, whereby the spring-pressure will be removed from the holding-down finger when the cam moves in one direction and will be reapplied when the cam moves in the opposite direction, substantially as set forth.

9. The combination, with a paper-feeding machine, of a sheet-buckling mechanism comprising a reciprocating buckling-finger and a spring-pressed holding-down finger, a lineally-reciprocating bar connected with the buckling-finger, a reciprocating cam connected with the reciprocating bar and adapted to operate and control the holding-down finger, a holding shoe or block mounted upon a pivotally-supported arm, a rock-shaft connected with the arm of the holding shoe or block, a rock-arm connected with the reciprocating bar, and a power-shaft suitably connected with the rock-shaft of the holding-shoe and the rock-arm of the buckler-operating mechanism, substantially as set forth.

10. In combination with a paper-feeding machine, a sheet-buckling device comprising a spring-pressed holding-down finger, a reciprocating buckling-finger, a lineally-reciprocating bar connected with the buckling-finger, and a reciprocating cam controlling the spring-pressure of the holding-down finger and connected with said reciprocating bar, an oscillating driving-shaft suitably connected with said reciprocating bar, a holding shoe or block mounted upon a pivotally-supported arm, a rock-shaft having a rock-arm connected with the supporting-arm of the holding shoe or block, and coupled rock-arms keyed respectively to the driving-shaft and rock-shaft, as set forth.

11. In combination with a paper-feeding machine, a sheet-buckling mechanism comprising a buckling-finger, a holding-down finger, a spring device engaging the holding-down finger, an intermittently-movable bar controlling the spring device, a dog on said bar, a stop limiting the movement of the dog in one direction, and a lineally-reciprocating cam engaging the dog, as set forth.

12. In combination with a paper-feeding machine, a sheet-buckling mechanism comprising a buckling-finger, a holding-down finger, an intermittently-movable spring device engaging the holding-down finger, a dog pivoted to said spring device and free to move in one direction, a stop for preventing the movement of the dog in the other direction, and a lineally-reciprocating cam supported beneath the dog and adapted, by its engagement therewith, to remove the pressure of the spring device from the holding-down finger when moving in one direction, substantially as set forth.

13. The combination, in a paper-feeding machine, of a pile-supporting table, suitable feeding instruments, a sheet-buckling device for effecting a preliminary separation of the sheets, and a spring-pressed rod or bar in constant engagement with the surface of the pile, the top sheets being buckled against said rod or bar and the underlying sheets being held back on the pile when the top buckled sheets are fed from the pile, substantially as set forth.

14. The combination, in a paper-feeding machine, of a pile-supporting table, a shaft geared to the table for elevating it, a ratchet-wheel keyed to said shaft, an oscillating arm carrying a pawl which operates said ratchet-wheel, a vibrating or reciprocating gage-rod controlled by the height of the pile of sheets, a rod connecting the oscillating pawl-supporting arm with the vibrating or reciprocating gage-rod, a tappet secured on said connecting-rod, a second reciprocating tappet arranged to engage the tappet on said connecting-rod, and means for reciprocating said second tappet, as set forth.

15. The combination in a paper-feeding machine, of a pile-supporting table, a shaft geared to the table for elevating it, a ratchet-wheel keyed to said shaft, an oscillating arm carrying a pawl which operates said ratchet-wheel, a reciprocating gage rod or bar, means controlled by the height of the pile of sheets for controlling the gage rod or bar, a connecting-rod suitably connected with the oscillating pawl-carrying arm and said gage-rod, whereby said pawl-carrying arm will be held against movement when the gage-rod is held by the pile-controlled means and a driving device including a tappet secured to the connecting-rod and a second tappet reciprocating adjacent thereto and adapted to engage said secured tappet for operating the pawl and reciprocating the gage rod or bar when the gage rod or bar is released by the pile-controlled means, substantially as set forth.

16. The combination, in a paper-feeding machine, of a pile-supporting table, an elevating-shaft geared to the table, a ratchet-wheel keyed to the elevating-shaft, an oscillating operating-pawl engaging the ratchet-wheel, a reciprocating gage-rod formed with a notch, a dog controlled by the height of the pile of sheets adapted to engage in the notch of the gage-rod for controlling the operation of the mechanism, a connecting-rod suitably connected with the ratchet operating-pawl and the gage-rod for coupling said parts and causing them to operate together, and suitable driving mechanism arranged to operate the pawl only when the dog is disengaged from the notch of the gage-rod, substantially as set forth.

17. In combination with a paper-feeding machine, a suitable shaft geared to the paper-supporting table for elevating it, a ratchet-wheel keyed to said shaft, an oscillating arm journaled upon said shaft and carrying a pawl which operates upon said ratchet-wheel, a reciprocating gage-rod formed with a notch, a bell-crank lever journaled to a stationary part of the machine and connected with said gage-rod, a rod connecting the oscillating pawl-supporting arm with said bell-crank lever and provided with a tappet, a power rock-arm carrying a tappet adapted to engage the tappet on the connecting-rod, and a dog controlled by the height of the pile of sheets adapted to engage in the notch of the gage-rod for controlling the operation of the mechanism, substantially as set forth.

18. In combination with a paper-feeding machine, a table-elevating mechanism comprising a ratchet-wheel geared to the elevating-screws of the table, an oscillating arm supporting a pawl in engagement with said ratchet-wheel, a bell-crank lever journaled upon a stationary support and carrying a freely-journaled antifriction-wheel upon one arm and a dog or detent upon its other arm, a reciprocating gage-rod formed with a notch into which said dog or detent may engage, a rock-arm connected with said gage-rod, a connecting-rod provided with a tappet connecting the oscillating pawl-supporting arm and said rock-arm, a second reciprocating tappet mounted to engage the tappet on said connecting-rod, a power rock-shaft, and a link connecting the power rock-shaft with said reciprocating tappet, substantially as set forth.

19. In a paper-feeding machine, the combination of a support for a pile of sheets, with feeding-off mechanism comprising a reciprocating carriage, a plurality of feed-fingers journaled in said carriage, a controlling-rod engaging said feed-fingers, and an automatically-controlled bar movably mounted in the carriage and actuating the controlling-rod, for simultaneously shifting the position of the feed-fingers by the single rod, as set forth.

20. In a paper-feeding machine, the combination of a support for a pile of sheets, with automatic feeding-off mechanism comprising a reciprocating carriage, a plurality of feed-fingers journaled in said carriage, a controlling-rod engaging said feed-fingers, a lever pivoted in the carriage and connected with said controlling-rod, and an automatically-controlled bar movably mounted in the carriage and engaging said lever, substantially as set forth.

21. In a paper-feeding machine, the combination of a support for a pile of sheets, with a feeding-off mechanism comprising a reciprocating carriage, feed-fingers journaled in said carriage, a controlling-rod engaging said feed-fingers, a lever pivoted to the carriage and to said controlling-rod, and an automatically-controlled cam-bar movably mounted in the carriage and controlled by the sheet being fed off, said cam-bar engaging said lever for controlling the operation of the feed-fingers, as set forth.

22. In a paper-feeding machine, the combination of a support for a pile of sheets, with feeding-off mechanism comprising a reciprocating carriage, feed-fingers journaled in the carriage, a movable controlling-rod provided with tappets, adjustable means of engagement between the tappets and feed-fingers, an automatically-controlled bar movably mounted in the carriage, and a suitable device forming a means of engagement or connection between the automatically-controlled bar and the controlling-rod, substantially as set forth.

23. In a paper-feeding machine, the combination of a support for a pile of sheets, with feeding-off mechanism comprising a reciprocating carriage, feed-fingers journaled in said carriage, a movable controlling-rod provided with tappets, adjustable pins or screws carried by the feed-fingers and engaging said tappets, a device on the carriage connected with or engaging the controlling-rod, and an automatically-controlled bar movably mounted in the carriage and engaging the connecting device, as set forth.

24. In a paper-feeding machine, the combination of a support for a pile of sheets, with feeding-off mechanism comprising a reciprocating carriage, feed-fingers journaled in the carriage and formed with controlling heels or lugs, a movable controlling-rod provided with tappets, pins or screws carried upon the heels or lugs of the feed-fingers and engaging said tappets, a lever journaled upon the carriage and engaging the controlling-rod, and an automatically-controlled bar movably mounted in the carriage and engaging said lever, substantially as and for the purpose set forth.

25. In a paper-feeding machine, the combination of a support for a pile of sheets, a feeder-carriage operating above the pile of sheets, means for operating the carriage, feeding instruments supported from the carriage, a rack-bar mounted upon the carriage and controlling the feeding instruments, a dog supported upon a stationary support in position to engage the rack-bar, and a tripper in the path of the sheets and having "lost-motion" connection with the dog and adapted to throw the dog into engagement with the rack-bar when the sheet reaches registered position, as set forth.

26. In a paper-feeding machine, the combination of a support for a pile of sheets, a feeder-carriage supported above the pile of sheets, means for operating the carriage, feeding instruments mounted upon the carriage, a rack-bar movably mounted upon the carriage and arranged to move the feeding instruments into or out of the plane of feed of the sheets, a pawl journaled upon a stationary support in position to engage the rack-bar and cause it to shift in the carriage, and a tripper supported in the path of the sheets and mechanically connected with the pawl for controlling it, as set forth.

27. In a paper-feeding machine, the combination of a support for a pile of sheets, a feeder-carriage operating above the pile of sheets, means for operating the carriage, feeding instruments supported from the carriage, a rack-bar movably mounted upon the carriage and controlling the feeding instruments, suitable stops arranged to engage the rack-bar at the front and rear ends of the strokes of the carriage for shifting said rack-bar, a dog supported upon a stationary support in position to engage the rack-bar, and a tripper in the path of the sheets having "lost-motion" connection with said dog, substantially as and for the purpose set forth.

28. In a paper-feeding machine, the combination of a support for a pile of sheets, with a feeding-off mechanism comprising a reciprocating carriage, feed-fingers journaled in said carriage, a controlling rack-bar movably mounted in the carriage and suitably connected with the feed-fingers for controlling their position, a dog journaled upon a stationary support in position to engage the rack-bar, a tripper supported in the path of the sheets, and a rod extending from the tripper and having "lost-motion" connection with the dog, as set forth.

29. In a paper-feeding machine, the combination of a support for a pile of sheets, with a feeding-off mechanism comprising a reciprocating carriage, feed-fingers journaled in said carriage, a controlling rack-bar movably mounted in the carriage and suitably connected with the feed-fingers for controlling their position, a dog journaled upon a stationary support in position to engage the rack-bar, a tripper supported in the path of the sheets, a rod connected with the tripper, a pin projecting from the dog, and a tappet on the rod engaging the pin and supporting the dog normally out of engagement with the rack-bar and adapted to drop the dog into engagement when the tripper is actuated by a passing sheet, substantially as set forth.

30. In a paper-feeding machine, the combination of a support for a pile of sheets, with a feeding-off mechanism comprising a reciprocating carriage, feed-fingers journaled in said carriage, a controlling rack-bar movably mounted in the carriage and suitably connected with the feed-fingers for controlling their position, a dog journaled upon a stationary support in position to engage the rack-bar, a tripper supported in the path of the sheets, a pin extending from the dog and having an opening through it, a connecting-rod connected with the tripper and passing loosely through the opening of said pin, and tappets secured to said connecting-rod above and below the pin of the dog, substantially as set forth.

31. In a paper-feeding machine, the combination of a support for a pile of sheets, a suitable feeding-off instrument, a sheet-separating mechanism comprising a stationary bed and a movable separating-pad, and air-blast pipes arranged to the rear of the separator-bed in position to supply upward currents of air under the sheet passing from the pile to the bed, substantially as and for the purpose set forth.

32. In a paper-feeding machine, the combination of a pile-supporting table, and a suitable feeding-off instrument, with air-blast pipes located in front of the forward edge of the table and having their outlet or blast ends slightly below the plane of feed, and extending upwardly to supply upward blasts of air beneath the sheets, whereby the sheets are slightly lifted as they pass from the machine, substantially as set forth.

33. In a paper-feeding machine, the combination of a pile-supporting table, and a suitable feeding-off instrument, with air-blast pipes extending vertically in front of the forward edge of the table with their outlet or blast ends slightly below the plane of feed, and rods or bars extending approximately horizontal above the plane of feed, whereby the sheets are slightly lifted as they pass from the machine, substantially as set forth.

34. In a paper-feeding machine, the combination of a pile-supporting table, a suitable feeding-off instrument working above the table on the pile, and a separator at the delivery end of the machine, with air-blast pipes extending vertically in front of the table between the feeding-off instrument and separator and having their outlet or blast ends slightly below the plane of feed, as set forth.

35. In a paper-feeding machine, the combination of a pile-supporting platform, a feeding-off instrument operating above the pile, a separator-bed at the delivery end of the machine in the plane of feed of the sheets, and a separator-pad operating above said bed, with a plurality of vertically-extending air-pipes arranged at one edge of the table between the feeding-off instrument and the separator-bed, said air-pipes being adapted to supply upward blasts of air beneath the sheets as they pass from the pile to the separator, as set forth.

36. In a machine for feeding sheets of paper from a pile, the combination with a movable flat pusher or separator-pad operated to travel in a rectangular path, of an opposing vertically-yielding and substantially flat separator adapted to prevent more than one sheet of paper being fed from the machine at one time, and a series of upwardly-extending air-blast tubes arranged between the forward edge of the pile and separator with the blast ends of the tubes below the plane of feed, substantially as and for the purpose set forth.

37. In combination with a paper-feeding machine, a sheet-calipering device comprising two movable members, one of which is capable of movement toward the other to cause said other to move when a sufficient thickness of sheets has been interposed between the members, and means for intermittently moving said first-named member toward said other member, substantially as set forth.

38. In combination with a paper-feeding machine, and throw-out mechanism for arresting the operation of the machine, of a sheet-calipering device comprising two movable members, one of said members being operatively connected with the throw-out mechanism and the other of said members being capable of movement toward and away from said first-named member for calipering the sheet and operating said first-named member, and means for operating said calipering device, as set forth.

39. In combination with a paper-feeding machine, and throw-out mechanism for arresting the operation of the machine, of a sheet-calipering device comprising two calipering members between which the sheets pass, one of said members being arranged to be moved by the movement of the other member, suitable operative connection between one of said members and the throw-out mechanism, a spring device tending to move one of said members toward the other, and means for normally holding said spring-actuated member against its spring tendency and for intermittently releasing it to allow it to be yieldingly moved toward the other member for calipering a sheet, and actuating the throw-out mechanism by moving said other member when an extra thickness of sheets is interposed between the members, as set forth.

40. In combination with a paper-feeding machine, and throw-out mechanism for arresting the operation of the machine, of a sheet-calipering device comprising two movable calipering members, a spring device actuating one of said members, suitable operating mechanism controlling said spring-actuated member for allowing it to intermittently move toward the other member, and a suitable connection between the said other member and the throw-out mechanism, said other member being moved by said first-named spring-actuated member when an improper thickness of sheets passes between them, whereby the operation of the machine will be automatically arrested, substantially as set forth.

41. In combination with a paper-feeding machine, and throw-out mechanism for arresting the operation of the machine, a sheet-calipering device comprising a pivoted member suitably connected with the throw-out mechanism for operating it, and a spring-pressed member held normally away from the pivoted member, and suitable operating mechanism constructed to control said spring-pressed member and allow it to intermittently approach the pivoted member under the action of its spring, substantially as set forth.

42. In combination with a paper-feeding machine, and throw-out mechanism for arresting the operation of the machine, of a sheet-calipering device, a pivoted lever suitably connected with the throw-out mechanism, a sliding spring-pressed calipering-bolt supported adjacent to said lever with a space between them for the passage of sheets, a rock-arm engaging said spring-pressed bolt, and operating mechanism for said rock-arm arranged to hold the bolt against its spring tendency and release it intermittently for calipering a sheet, as set forth.

43. In combination with a paper-feeding machine, and an automatic throw-out mechanism therefor, a sheet-calipering device comprising a pivoted calipering-lever suitably connected with the automatic throw-out mechanism, a vertically-sliding spring-pressed caliper-bolt formed with a controlling lug or heel, a rock-arm engaging said lug or heel of the calipering-bolt and a cam mechanism operating said rock-arm for holding the bolt normally under tension and for intermittently releasing it to the action of its spring, substantially as set forth.

44. In combination with a paper-feeding machine, and an electrically-operated throw-out mechanism for arresting the operation of the machine, of a sheet-calipering device comprising a pivoted calipering-lever controlling an electric contact of the electrically-operated throw-out, and a spring-pressed calipering-bolt provided with an automatic controlling mechanism which holds it normally under tension and allows it to intermittently close upon the pivoted calipering-lever, substantially as set forth.

45. In combination with a paper-feeding machine, and an electrically-operated throw-out mechanism for arresting the operation of the machine, of a sheet-calipering lever, an electric contact-lever engaged and operated by the calipering-lever, an electric contact with which the contact-lever contacts, the contact-lever and point being in the circuit of the throw-out mechanism, and a spring-pressed calipering-bolt provided with an automatic controlling mechanism, substantially as and for the purpose set forth.

46. In a paper-feeding machine, the combination of a paper-supporting table and paper-feeding devices, with a main driving-shaft suitably geared to the feeding devices, a power-gear loosely journaled upon the driving-shaft, a clutch member connected with said power-gear, a second clutch member keyed to the driving-shaft, a clutching-lever journaled upon said second clutch member and formed with a projecting head and a clutch-dog, and a movable clutch-actuating device adapted to be shifted into the path of the clutching-lever, whereby the dog will be disengaged from the clutch members and the machine will be positively stopped, as set forth.

47. In a paper-feeding machine, the combination of a paper-supporting table, and suitable feeding devices, with a driving-shaft suitably geared to the feeding devices, a clutch comprising loose and fixed members upon said shaft, a clutching-dog arranged to engage the fixed and loose clutch members, a sliding bolt supported upon a stationary support and adapted to engage the clutch-dog, a sliding cam engaging the bolt, and means for operating the sliding cam, substantially as set forth.

48. In a paper-feeding machine, the combination of a paper-supporting table and suitable feeding devices, with an operating-shaft carrying fixed and loose clutch members, a drop-roller delivery mechanism, a cam on the power-shaft controlling the drop-roller mechanism, and suitable means operated by the drop-roller-controlling mechanism for actuating the clutch, substantially as set forth.

49. In a paper-feeding machine, the combination of a paper-supporting table and suitable feeding devices, with a power-shaft carrying loose and fixed clutch members, a clutch-dog arranged to engage said clutch members, a drop-roller mechanism, a cam on the power-shaft controlling the drop-roller mechanism, an automatic sheet-calipering tripping device, and means controlled by the sheet-calipering device and operated by the drop-roller mechanism for actuating the dog, substantially as set forth.

50. In a paper-feeding machine, the combination of a paper-supporting table, suitable feeding devices, drop-roller sheet-delivery mechanism, a power-shaft, a cam upon said power-shaft, a drop-roller-controlling arm carrying an antifriction-roller which operates upon said cam, a clutch mechanism upon said power-shaft, a clutch-shipping device, a sheet-calipering device, and an automatic tripper controlled by the sheet-calipering device and arranged to connect the shipping-lever with the drop-roller-controlling bar, whereby the former will be operated by the latter, substantially as set forth.

51. In a paper-feeding machine, the combination of a paper-supporting table, and paper-feeding instruments, with drop-roller delivery mechanism, a controlling operating-bar for the drop-rollers, a shaft carrying a cam which operates said controlling operating-bar, a clutch on said shaft, a clutch-operating bar, a shoulder or detent on the operating and controlling bar of the drop-rollers with which said dog engages, and a sheet-calipering device controlling said dog, substantially as and for the purpose set forth.

52. In a paper-feeding machine, the combination of a paper-supporting table, and suitable paper-feeding instruments with drop-roller delivery mechanism comprising suitable drop-rollers, an operating-bar suitably connected with the drop-rollers, an antifriction-roller carried by said operating-bar, a cam having a double or two-part drop upon which said antifriction-roller operates, a clutch gearing said shaft to the power mechanism, and an automatically-controlled clutch-operating device having means for operating it by the first movement of the drop-roller-operating bar, whereby the clutch will be thrown out and the operation of the machine arrested before the drop-rollers are allowed to operate, substantially as and for the purpose set forth.

53. In a paper-feeding machine, the combination of a paper-supporting table, and suitable feeding instruments, with suitable drop-roller mechanism comprising drop-rollers, an operating-bar, a cam having a double or two-part drop or depression and an antifriction-roller carried by the operating-bar and engaging said cam, a power-shaft upon which said cam is mounted, a clutch upon said shaft, a clutch-operating bar, a dog mounted upon said clutch-operating bar, a detent or shoulder upon the drop-roller-operating bar with which said dog engages, a calipering device, and an automatic device controlled by said calipering device for tripping said dog, whereby the clutch will be thrown out by the drop-roller-operating mechanism before the drop-rollers operate, substantially as and for the purpose set forth.

54. In a paper-feeding machine, the combination of a paper-supporting table, and suitable feeding devices, with a power-shaft carrying loose and fixed clutch members, a clutch-dog arranged to engage said clutch members, a drop-roller mechanism, a cam on the power-shaft controlling the drop-roller mechanism, means operated by the drop-roller mechanism for actuating said dog, and a sheet-actuated device controlling the dog-actuating means, substantially as set forth.

TALBOT C. DEXTER.

Witnesses:
WM. E. KNIGHT,
M. V. BIDGOOD.